(12) United States Patent
Choi et al.

(10) Patent No.: US 11,789,498 B2
(45) Date of Patent: Oct. 17, 2023

(54) DISPLAY DEVICE

(71) Applicant: Samsung Display Co., LTD., Yongin-si (KR)

(72) Inventors: Yun Mi Choi, Yongin-si (KR); Dong Hyun Kim, Pyeongtaek-si (KR); Ok Kyung Park, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 86 days.

(21) Appl. No.: 17/579,911

(22) Filed: Jan. 20, 2022

(65) Prior Publication Data

US 2022/0404866 A1 Dec. 22, 2022

(30) Foreign Application Priority Data

Jun. 16, 2021 (KR) .................. 10-2021-0078037

(51) Int. Cl.
*G06F 1/16* (2006.01)

(52) U.S. Cl.
CPC .......... *G06F 1/1652* (2013.01); *G06F 1/1616* (2013.01); *G06F 1/1624* (2013.01)

(58) Field of Classification Search
CPC ..... G06F 1/1624; G06F 1/1652; G06F 1/1616
See application file for complete search history.

(56) References Cited

U.S. PATENT DOCUMENTS

| | | | | |
|---|---|---|---|---|
| 10,194,543 B2* | 1/2019 | Seo | ........................ | G06F 1/1626 |
| 10,588,228 B2* | 3/2020 | Kikuchi | ................ | G06F 1/1681 |
| 10,645,205 B2* | 5/2020 | Lee | ........................ | G06F 1/1624 |
| 10,798,836 B2* | 10/2020 | Manuel | ................ | H04M 1/0216 |
| 10,820,433 B2* | 10/2020 | Cha | ........................ | H05K 5/0226 |
| 10,868,264 B2* | 12/2020 | Shin | ........................ | G06F 1/1601 |
| 11,003,217 B2* | 5/2021 | Cha | ........................ | G06F 1/1681 |
| 11,190,629 B1* | 11/2021 | Koh | ........................ | G06F 3/041 |
| 11,387,575 B2* | 7/2022 | Choi | ........................ | H01Q 9/42 |
| 11,644,866 B2* | 5/2023 | Chueh | ................ | G06F 1/1656 |
| | | | | 361/679.01 |

(Continued)

FOREIGN PATENT DOCUMENTS

| KR | 1020190113128 A | 10/2019 |
|---|---|---|
| KR | 1020190119719 A | 10/2019 |
| KR | 1020200118264 A | 10/2020 |

*Primary Examiner* — Nidhi Thaker
(74) *Attorney, Agent, or Firm* — CANTOR COLBURN LLP

(57) ABSTRACT

A display device includes a display panel including a non-folding area and a sliding area in order along a first direction, a display surface in the non-folding area and the sliding area, and the sliding area including an exposed area of the display surface closest to the non-folding area, the exposed area having a length along the first direction which is variable, a support member coupled to the display panel and movable together with the display panel, and a housing facing the support member with the display panel therebetween and defining an opening corresponding to the non-folding area. The housing is slidably extendable and contractable along the first direction, at the sliding area, the housing which is slidably contracted defines a first length of the exposed area, and the housing which is slidably extended defines a second length of the exposed area which is larger than the first length.

20 Claims, 21 Drawing Sheets

(56) References Cited

U.S. PATENT DOCUMENTS

| | | | |
|---|---|---|---|
| 2012/0162876 A1* | 6/2012 | Kim | G06F 1/1652 |
| | | | 361/679.01 |
| 2012/0212433 A1* | 8/2012 | Lee | G06F 1/1643 |
| | | | 345/173 |
| 2015/0055287 A1* | 2/2015 | Seo | G06F 1/1641 |
| | | | 361/679.27 |
| 2015/0257290 A1* | 9/2015 | Lee | H05K 5/0021 |
| | | | 361/749 |
| 2018/0097197 A1* | 4/2018 | Han | H05K 5/0017 |
| 2018/0294427 A1* | 10/2018 | Lee | H10K 50/86 |
| 2020/0326754 A1* | 10/2020 | Kim | G09F 9/301 |
| 2022/0269307 A1* | 8/2022 | Lee | G06F 1/1624 |

* cited by examiner (a)  (b)

DISPLAY DEVICE

This application claims priority to Korean Patent Application No. 10-2021-0078037 filed on Jun. 16, 2021, and all the benefits accruing therefrom under 35 U.S.C. 119, the contents of which in its entirety are herein incorporated by reference.

BACKGROUND

1. Field

The disclosure relates to a display device.

2. Description of the Related Art

The importance of display devices has steadily increased with the development of multimedia technology. Accordingly, various types of display devices such as a liquid crystal display (LCD) device, an organic light emitting display (OLED) device and the like have been used.

An electronic device, such as a mobile electronic device, includes a display unit to provide images to a user. A bendable display device, a foldable display device, a rollable display device, a slidable display device, a stretchable display device, and the like in which a flexible display panel that can be bent, folded, or rolled is applied, have been developed.

SUMMARY

Embodiments provide a display device capable of maximizing the size of an area where an image is displayed in an unfolded state while minimizing the volume of the display device in a folded state.

However, features of the disclosure are not restricted to the one set forth herein. The above and other features of the disclosure will become more apparent to one of ordinary skill in the art to which the disclosure pertains by referencing the detailed description of the disclosure given below.

In an embodiment of the display device, it is possible to maximize the size of an area where an image is displayed in the display device which is unfolded (e.g., in an unfolded state) while minimizing the volume of the display device which is folded (e.g., in a folded state). In addition, a display panel may be protected by exposing a plate member through an outer opening of a housing in a slidingly extended state.

However, the effects of the disclosure are not limited to the aforementioned effects, and various other effects are included in the present specification.

According to an embodiment of the disclosure, a display device includes a display panel including a first non-folding area, a second non-folding area on one side of the first non-folding area, a folding area between the first non-folding area and the second non-folding area, and a sliding area located opposite to the folding area with the second non-folding area interposed therebetween and having an exposed area increasing during sliding extension, a housing surrounding at least a part of the display panel, a hinge member coupled to the housing and foldable together with the housing, and a support member coupled to the display panel. The housing includes a first opening exposing at least a part of the sliding area in a slidingly non-extended state and exposing at least a part of the support member in a slidingly extended state.

The housing may include a first housing including the first opening and surrounding the sliding area, and changing an area of an exposed surface of the sliding area, a second housing partially overlapping the first housing and surrounding the first non-folding area, and a third housing opposite to the second housing with the hinge member interposed therebetween and surrounding the second non-folding area.

A display device may further include a support member on a rear surface of the folding area that is opposite to a display surface, where the support member includes a first support member on a rear surface opposite to a display surface of the first non-folding area and coupled to the folding member, a plurality of second support members on a rear surface opposite to a display surface of the sliding area and having a bar shape extending in one direction, and a third support member coupled to an outer end of the sliding area.

A display device may further include a roller member coupled to the first housing and extending in the same direction as a direction in which each of the second support members extends, where the plurality of second support members surround the roller member.

A distance between the first support member and the second support member in contact with the roller member among the plurality of second support members may increase as the display device changes from the slidingly non-extended state to the slidingly extended state.

A display device may further include an optical sensor module coupled to the first housing, where the optical sensor module includes a first module facing toward the other side of a first direction and overlapping the first opening and a second module facing one side of the first direction.

The sliding area may include a first sensing area having a light transmittance lower than that of a surrounding area, the first non-folding area may include a second sensing area having a light transmittance lower than that of a surrounding area, and in the slidingly non-extended state, the first module may overlap the first sensing area, and the second module may overlap the second sensing area.

The plurality of second support members may include a second opening partially exposing the sliding area, the first support member may include a third opening partially exposing the first non-folding area, the second opening may overlap the first sensing area, and the third opening may overlap the second sensing area.

In the slidingly non-extended state, the first module may receive light transmitted through the first opening, the second opening and the first sensing area, and the second module may receive light transmitted through the third opening and the second sensing area, and in the slidingly extended state, the second module may receive light transmitted through the second opening and the first sensing area.

A thickness of the third support member may be greater than a thickness of the second support member or a thickness of the display panel.

The first housing may expose at least a part of a curved portion of the sliding area.

The second housing may be movable away from the first opening as slidingly non-extended state changes to the slidingly extended state.

A substrate may be included in at least one of the folding area or the sliding area and include a plurality of island-like patterns and a plurality of bridge patterns which connect the plurality of island-like patterns adjacent to each other.

According to an embodiment of the disclosure, a display device having a first state that is a folded and slidingly non-extended state, a second state that is an unfolded and slidingly non-extended state, and a third state that is an unfolded and slidingly extended state, includes a display panel including a first non-folding area and a sliding area connected to the first non-folding area, a support member including a plurality of first support members on a rear surface opposite to a display surface of the sliding area, a second support member coupled to an outer end of the sliding area, and a roller member surrounded by the plurality of first support members, and a first housing surrounding at least a part of the support member and including a first opening, where the first housing exposes at least a part of the display surface of the sliding area in the first state and the second state, and exposes at least a part of the second support member in the third state.

A distance between the roller member and the second support member may decrease as the second state changes to the third state.

A display device may further include an optical sensor module coupled to the first housing, where the optical sensor module may include a first module facing toward the other side of a first direction and overlapping the first opening and a second module facing toward one side of the first direction, the sliding area may include a first sensing area having a light transmittance lower than that of a surrounding area, the first non-folding area may include a second sensing area having a light transmittance lower than that of a surrounding area, and in the first state and the second state, the first module may overlap the first sensing area, and the second module may overlap the second sensing area.

A display device may further include a third support member on a rear surface opposite to a display surface of the first non-folding area, where the plurality of first support members may include a second opening partially exposing the sliding area, the third support member may include a third opening partially exposing the first non-folding area, the second opening may overlap the first sensing area, and the third opening may overlap the second sensing area.

In the second state, the first module may receive light transmitted through the first opening, the second opening and the first sensing area, and the second module may receive light transmitted through the third opening and the second sensing area, and in the third state, the second module may receive light transmitted through the second opening and the first sensing area.

The first housing may expose at least a part of a curved portion of the sliding area.

A direction in which the display surface of the sliding area faces changes by movement of the first support members along the roller member.

BRIEF DESCRIPTION OF THE DRAWINGS

The above and other features of the disclosure will become more apparent by describing in detail embodiments thereof with reference to the attached drawings, in which.

DETAILED DESCRIPTION

Figure 1:
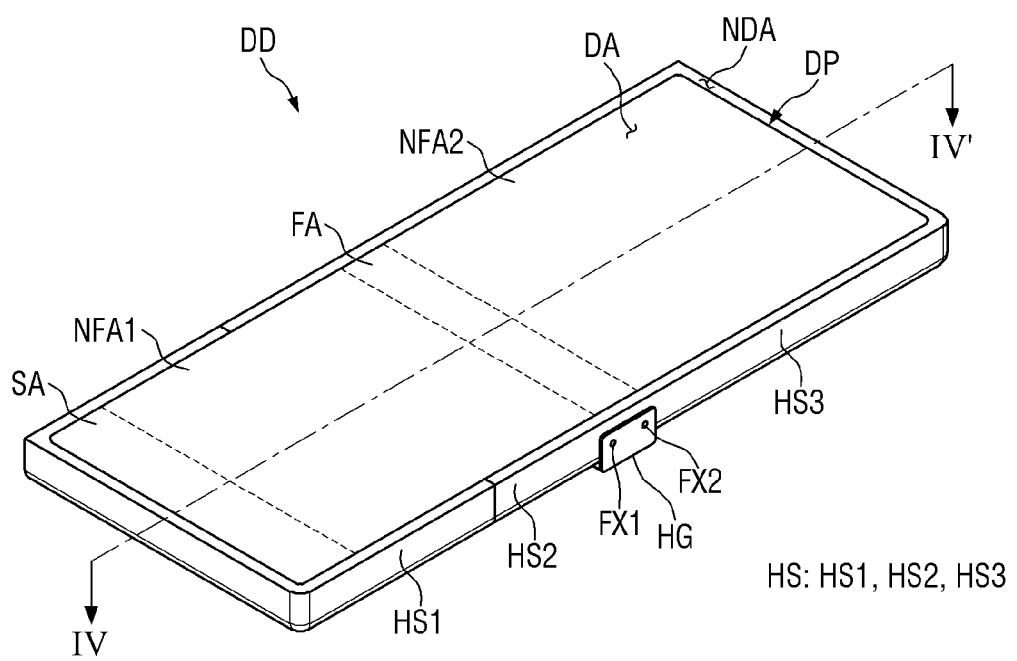
FIG. 1 is a perspective view of an embodiment of a display device which is unfolded.

The invention will now be described more fully hereinafter with reference to the accompanying drawings, in which embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being related to another elements such as being "on" another layer or substrate, it can be directly on the other layer or substrate, or intervening layers may also be present. In contrast, when a layer is referred to as being related to another elements such as being "directly on" another layer or substrate, no other layer or substrate, or intervening layer is present. The same reference numbers indicate the same components throughout the specification. As used herein, a reference number may indicate a singular element or a plurality of the element. For example, a reference number labeling a singular form of an element within the drawing figures may be used to reference a plurality of the singular element within the text of specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the invention. Similarly, the second element could also be termed the first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

For the convenience of description, in referring to the display device DD or the surfaces of each member constituting the display device DD, one surface facing the direction in which the image is displayed is referred to as the upper surface, and the other surface, which is opposite surface of the one surface is referred to as the lower surface. However, the invention is not limited thereto, and the one surface and the other surface of the member may be referred to as a front surface and a rear surface, respectively, or may be referred to as a first surface or a second surface "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be described in detail with reference to the accompanying drawings.

Figure 2:
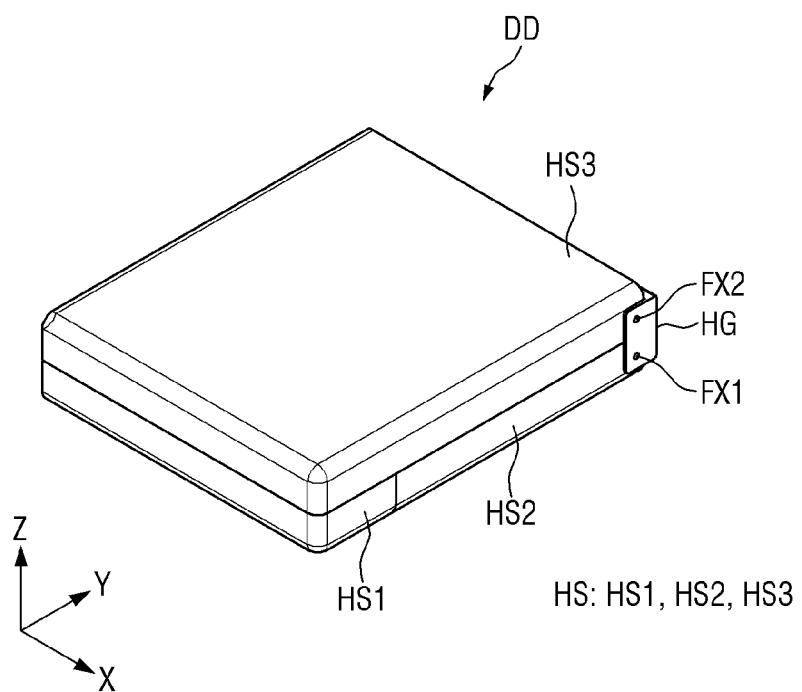
FIG. 2 is a perspective view of an embodiment of a display device which is folded.
Figure 3:
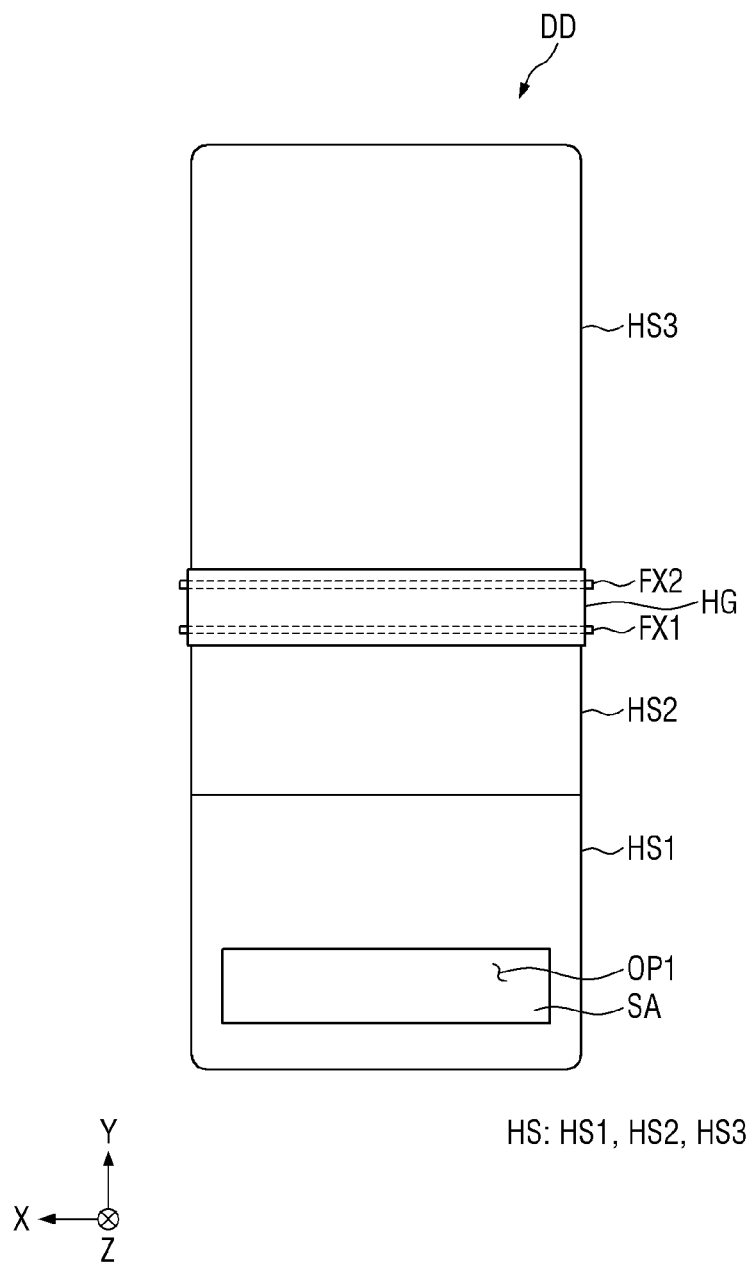
FIG. 3 is a rear plan view of an embodiment of a display device which is unfolded.
Figure 4:
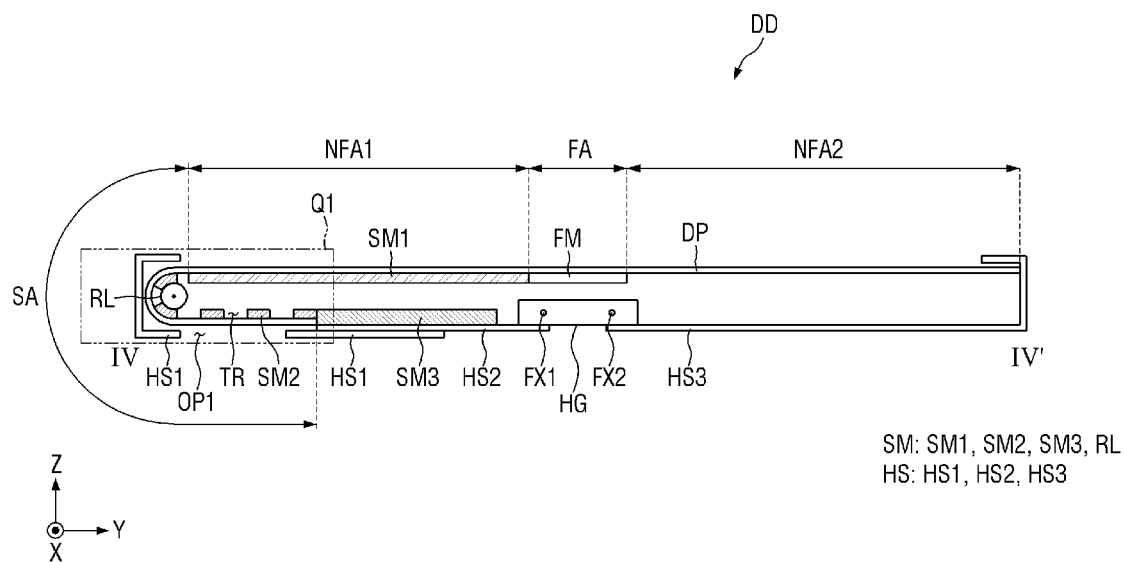
FIG. 4 is a cross-sectional view taken along line IV-IV' of FIG. 1.
Figure 5:
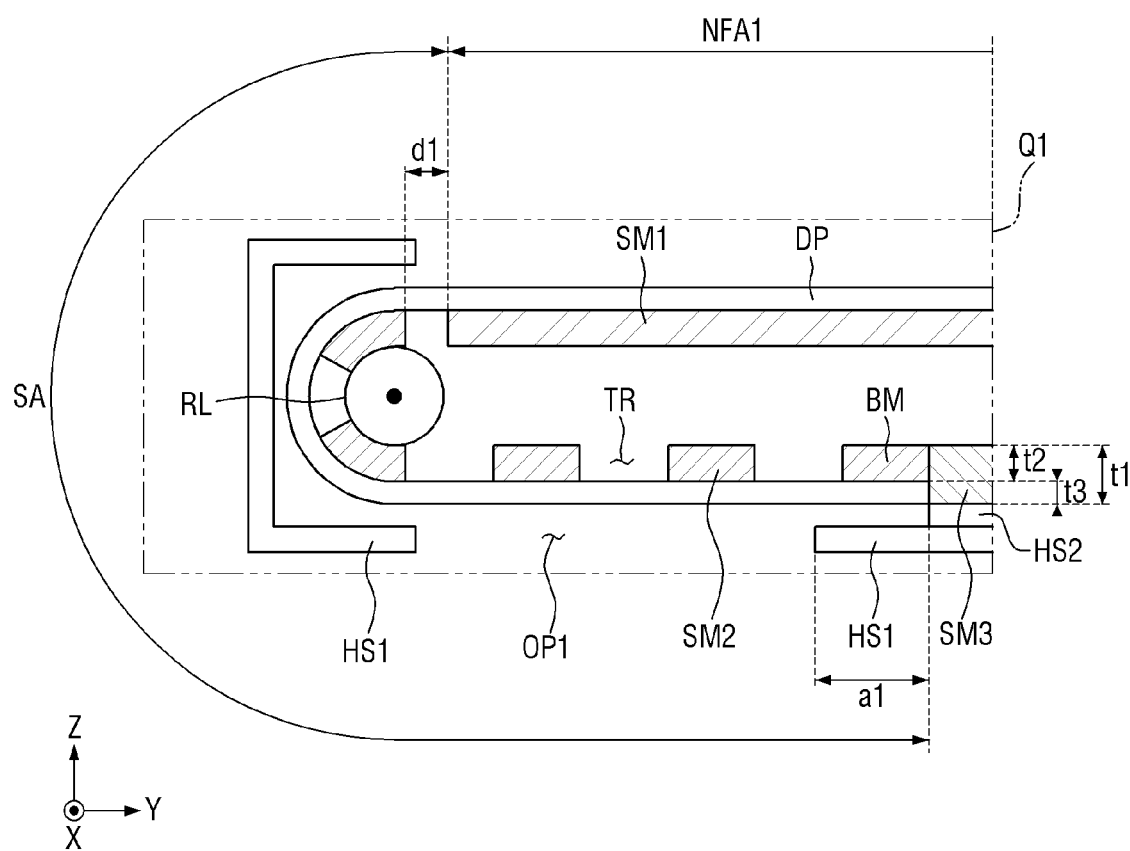
FIG. 5 is an enlarged view of area Q1 of FIG. 4.
Figure 6:
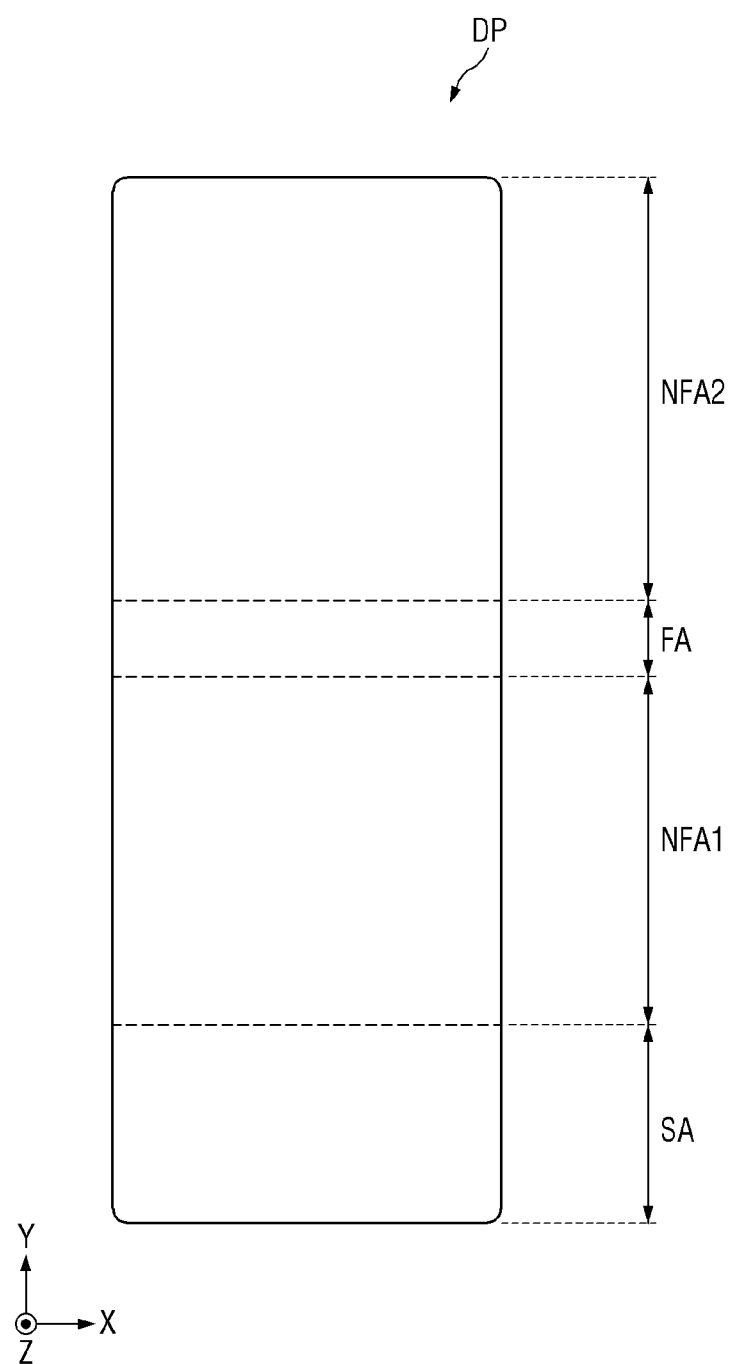
FIG. 6 is a plan view of an embodiment of a display panel.
Figure 7:
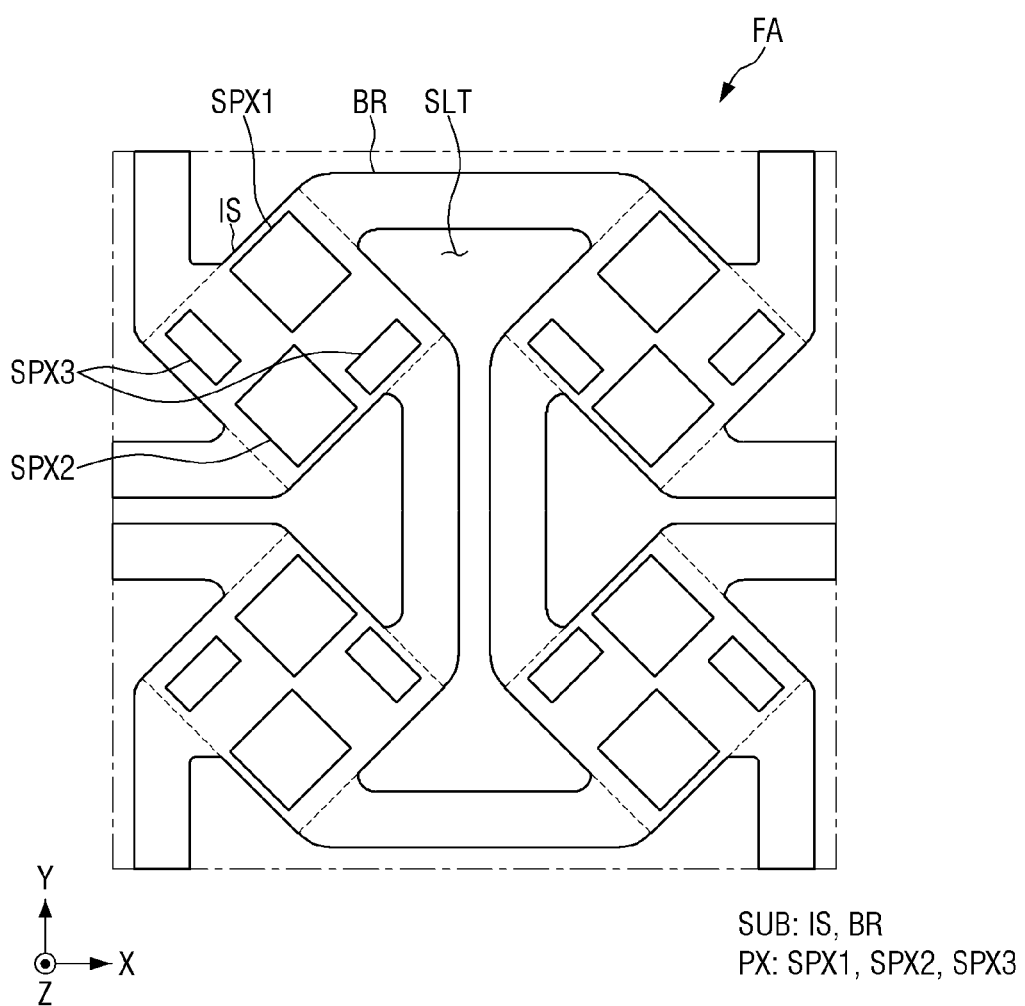
FIG. 7 is a plan view of an embodiment of a folding area in a display panel.
Figure 8:
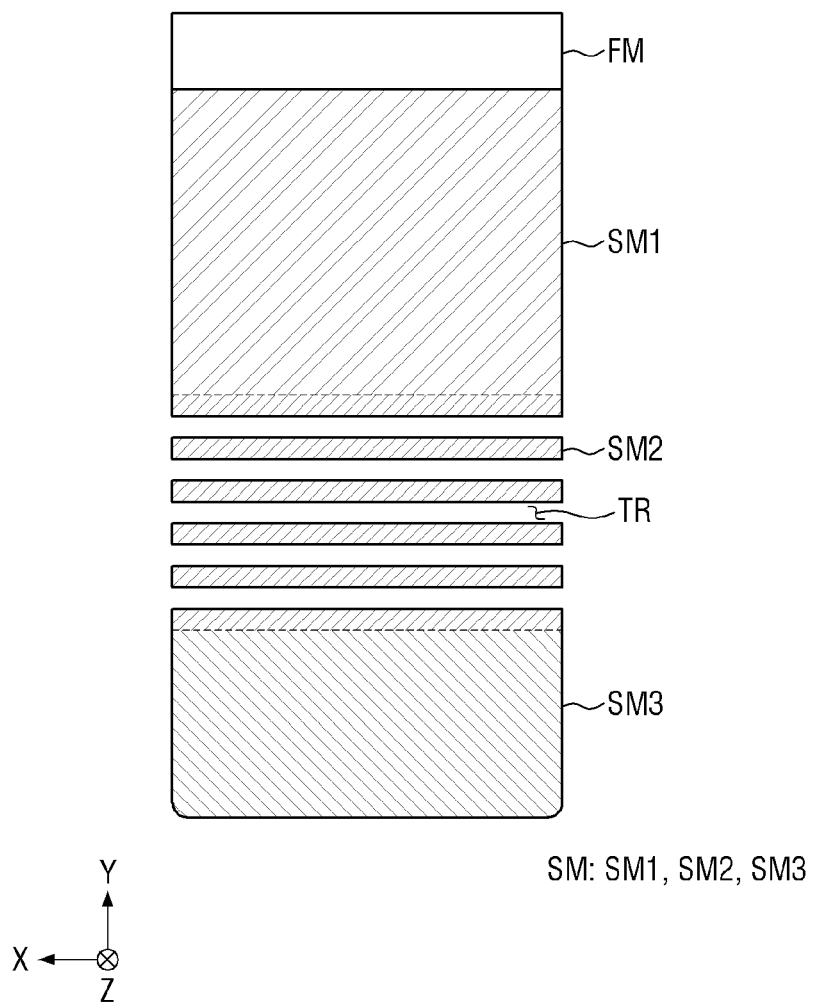
FIG. 8 is a plan view of an embodiment of a support member of a display device.

FIG. 1 is a perspective view of an embodiment of a display device DD which is unfolded. FIG. 2 is a perspective view of an embodiment of a display device DD which is folded. FIG. 3 is a rear plan view of an embodiment of a display device DD which is unfolded. FIG. 4 is a cross-sectional view taken along line IV-IV' of FIG. 1. FIG. 5 is an enlarged view of area Q1 of FIG. 4. FIG. 6 is a plan view of an embodiment of a display panel DP which is unfolded. FIG. 7 is a plan view of an embodiment of a folding area FA in a display panel DP. FIG. 8 is a plan view of an embodiment of a support member SM of a display device DD which includes a plurality of support members.

Referring to FIGS. 1 to 8, a display device DD may have a rectangular shape in a plan view. In an embodiment, the display device DD may include two short sides extending in (or along) a first direction X and two long sides extending in (or along) a second direction Y intersecting the first direction X in a plan view. However, the disclosure is not limited thereto, and the display device DD may have various shapes.

The display device DD may be various electronic devices for displaying an image or having a screen on which an image is displayed. Examples of the electronic device and/or the display device DD may be a smartphone, a mobile phone, a tablet PC, a personal digital assistant (PDA), a portable multimedia player (PMP), a television, a game machine, a wristwatch-type electronic device, a head-mounted display, a monitor of a personal computer, a laptop computer, a car navigation system, a car's dashboard, a digital camera, a camcorder, an external billboard, an electronic billboard, various medical devices, various inspection devices, various household appliances such as a refrigerator and a washing machine including a display unit, an Internet-of-Things device, and the like, but are not limited thereto.

The display device DD may include a display area DA and a non-display area NDA. The display area DA may display an image or a video. A plurality of pixels PX may be disposed in the display area DA. As shown in FIG. 1, the display area DA may be disposed on or define the top surface of the display device DD.

The non-display area NDA may not display an image or a video. The non-display area NDA may be disposed adjacent to the display area DA, such as around the display area DA. The non-display area NDA may be disposed to surround the display area DA. The non-display area NDA may be, for example, an area (e.g., a planar area) in which a light blocking member such as a black matrix is disposed. In an embodiment, the display area DA may have a rectangular shape, and the non-display area NDA may be disposed to surround four sides of the display area DA, but the disclosure is not limited thereto.

The display device DD may be a foldable display device DD which is foldable and unfolded (e.g., can be folded or unfolded). In addition, the display device DD may be a slidable display device DD which is slidable (e.g., can be slidingly extended or slidingly retracted or non-extended). In the following description, the display device DD which is slidably extended (e.g., a slidingly extended state) may maximize an exposed part of the display area DA by a maximum sliding movement of the display device DD. The display device DD which is slidably retracted or non-extended (e.g., a slidingly non-extended state) may minimize an exposed part of the display device DD.

The display device DD may include a display panel DP generating and/or displaying an image, a housing HS surrounding the display panel DP, a hinge member HG and a folding member FM enabling a folding operation, and a support member SM enabling a sliding operation. The housing HS may include a first housing HS1, a second housing HS2, and a third housing HS3. The support member SM may include a roller member RL, a first support member SM1, a second support member SM2, and a third support member SM3. The housing HS is slidably extendable and slidably contractable along a direction (e.g., the second direction Y), at the sliding area SA of the display panel DP.

The display panel DP may include a folding area FA, a first non-folding area NFA1, a second non-folding area NFA2, and a sliding area SA. Each of the folding area FA, the first non-folding area NFA1, the second non-folding area NFA2, and the sliding area SA of the display panel DP may be a display area DA of the display device DD, without being limited thereto. The sliding area SA may be extended from a non-display area (e.g., the first non-folding area NFA1) along an extension direction (e.g., second direction Y) of the display device DD. The folding area FA, a non-folding area (e.g., first non-folding area NFA1) and a sliding area SA are in order along a direction (e.g., second direction Y).

The folding area FA may be an area that is foldable or bendable to be respectively folded or bent when the display device DD is folded. The non-folding area may be an area maintaining evenness or flatness without being folded or bent even when the display device DD is folded. The sliding area SA may be an area that is bent during the sliding extension and non-extension (e.g., retraction) operations of the display device DD.

The first non-folding area NFA1 and the second non-folding area NFA2 may be arranged in (or along) the second direction Y, and the folding area FA may be disposed between the first non-folding area NFA1 and the second non-folding area NFA2. In an embodiment, for example, the first non-folding area NFA1 may be disposed on the other side (e.g., a second side) of the folding area FA in the second direction Y, and the second non-folding area NFA2 may be disposed on one side (e.g., a first side) of the folding area FA opposite to the other side in the second direction Y. The first non-folding area NFA1 may be smaller in size than the second non-folding area NFA2. That is, a planar area of the first non-folding area NFA1 which is defined by a product of dimensions along the first direction X and the second direction Y, may be smaller than a planar area of the second non-folding area NFA2 which is defined by a product of dimensions along the first direction X and the second direction Y.

The sliding area SA may be disposed on the other side of the first non-folding area NFA1 in the second direction Y. That is, the sliding area SA may be located opposite to the folding area FA with the first non-folding area NFA1 interposed therebetween. The sliding area SA may be connected to the first non-folding area NFA1. Even when the display device DD is folded or unfolded, an angle between the first non-folding area NFA1 and the sliding area SA which are exposed to outside of the display device DD may be about 180°. In the slidingly non-extended state of the display device DD, a sum of the size (e.g., planar area) of the first non-folding area NFA1 and the size of the sliding area SA which are exposed to outside the display device DD may be substantially equal to the size of the second non-folding area NFA2.

One side of the sliding area SA may be connected to the first non-folding area NFA1, and the other side thereof may be coupled to the third support member SM3 to be described later. The sliding area SA may be bendable to be bent at the other end in the second direction Y of the display device DD. That is, the direction in which the display surface of the sliding area SA faces may be reversed at the other end in the second direction Y of the display device DD. The display surface at a part of the sliding area SA connected to the first non-folding area NFA1 may be disposed substantially toward one side along the third direction Z. The display surface at a part of the sliding area SA coupled to the third support member SM3 may be disposed substantially toward the other side along the third direction Z (e.g., opposite direction). That is, the display surface may face in directions opposite to each other. The display surface at the sliding area SA faces in a facing direction, and movement the plurality of support members around the roller member RL changes the facing direction of the display surface at the sliding area SA. In the slidingly non-extended state of the display device DD, the part of the sliding area SA coupled to the third support member SM3 may be partially exposed to outside the housing HS by a first opening OP1 defined in the first housing HS1.

The sliding area SA may partially overlap the first non-folding area NFA1. When the display device DD is slidingly extended, an overlapping area between the sliding area SA and the first non-folding area NFA1 may decrease, and when the display device DD is slidingly retracted (e.g., is not slidingly extended), the overlapping area between the sliding area SA and the first non-folding area NFA1 may increase.

When the display device DD is folded, the second non-folding area NFA2 overlaps both of the first non-folding area NFA1 and the sliding area SA along the third direction Z (e.g., thickness direction). Alternatively, the display device DD may be bent or flattened such that the second non-folding area NFA2 is inclined with respect to the first non-folding area NFA1 and the sliding area SA. In an embodiment, for example, the display device DD may be folded such that the second non-folding area NFA2 forms an angle greater than about 0° and less than 180° with respect to the first non-folding area NFA1 and/or the sliding area SA, or may be unfolded such that the second non-folding area NFA2 forms an angle of about 180° with respect to the first non-folding area NFA1 and the sliding area SA.

As shown in FIG. 1, when the display device DD is unfolded, the first non-folding area NFA1, the folding area FA, and the second non-folding area NFA2 may each be flat so that they do not overlap each other in a thickness direction. The first non-folding area NFA1, the folding area FA, and the second non-folding area NFA2 may be coplanar with each other in the display device DD which is unfolded, without being limited thereto. As shown in FIG. 2, when the display device DD is folded, the first non-folding area NFA1 and the second non-folding area NFA2 may overlap each other in the thickness direction. Although not shown, when the display device DD is folded, the first non-folding area NFA1 and the second non-folding area NFA2 may be disposed to be inclined to each other. In this case, at least a part of the first non-folding area NFA1 and at least a part of the second non-folding area NFA2 may or may not overlap each other in the thickness direction.

In an embodiment, one of the folding area FA and two non-folding areas NFA1 and NFA2 are exemplified, but the number and arrangement of the folding area FA and the non-folding areas NFA1 and NFA2 are not limited thereto. Although not shown, members constituting the display device DD may also be divided into the folding area FA and/or the non-folding areas NFA1 and NFA2 according to an area where they are disposed. Members constituting the display device DD may also include a display area DA and a non-display area NDA corresponding to those described above.

Referring to FIG. 7, the folding area FA may have a structure that is stretchable when the display panel DP is folded and partially stretched in the folding area FA. That is, the display panel DP may include a substrate SUB having a stretchable structure in the folding area FA.

In the folding area FA, the substrate SUB may include an island pattern provided in plural including a plurality of island-like patterns IS and a bridge pattern BR provided in plural including a plurality of bridge patterns BR which connect the plurality of island-like patterns IS adjacent to each other. Although not shown, the substrate SUB may be disposed in an entirety of the first non-folding area NFA1 and the second non-folding area NFA2. That is, a material constituting the substrate SUB may be disposed in an entirety of the first non-folding area NFA1 and the second non-folding area NFA2.

The substrate SUB disposed in the folding area FA may have an island structure. In the folding area FA, the substrate SUB may include the plurality of island-like patterns IS and the plurality of bridge patterns BR which connect the island-like patterns IS adjacent to each other. Here, being adjacent to each other may mean a relationship between one island-like pattern IS and another island-like pattern IS disposed to be spaced apart from each other by the shortest distance.

In the folding area FA, the plurality of island-like patterns IS may be arranged along the first direction X and the second direction Y. The plurality of island-like patterns IS may be arranged in a matrix form. The island-like patterns IS adjacent to each other may be connected to each other through at least one bridge pattern BR.

Each island-like pattern IS is separated by a cutout portion SLT (e.g., substrate opening). The cutout portion SLT may be surrounded by the island-like pattern IS and the bridge pattern BR in a plan view. The cutout portion SLT may penetrate the substrate SUB in the thickness direction, such as to be open at both surfaces opposing each other along the thickness direction, without being limited thereto. A material constituting the substrate SUB may not be present in the cutout portion SLT. The cutout portion SLT in which the constituent material of the substrate SUB does not exist (e.g., is absent) may be deformed more freely with respect to stretching than the portion filled with the constituent material of the substrate SUB (e.g., solid portion). That is, a solid portion of the substrate SUB may define the island pattern (e.g., island-like pattern IS and the bridge pattern BR) and the cutout portion SLT which is between solid portions. Accordingly, when the substrate SUB partially expands or contracts, expansion and contraction are easier by the cutout portion SLT, so that stress applied to the substrate SUB may be reduced.

Each island-like pattern IS may have a rectangular shape. The island-like pattern IS in the substrate SUB which is unfolded (illustrated in FIG. 7) is configured such that pairs of the four corners in the rectangular shape are disposed on one side and the other side of the first direction X and on one side and the other side of the second direction Y, but is not limited thereto. In addition, the shape of the island-like pattern IS may be variously modified into another polygonal shape, a circular shape, an elliptical shape, or the like.

The bridge pattern BR connecting the island-like patterns IS to each other may have a shape extending in one direction. That is the bridge pattern BR may have a major dimension extending in one direction.

A structure of the pixel PX such as the thin film transistor and the light emitting element may be disposed on (e.g., corresponding to) each island-like pattern IS. One pixel PX may be disposed on each of the island-like patterns IS. One pixel PX may include a plurality of sub-pixels SPX1, SPX2, and SPX3. The plurality of sub-pixels SPX1, SPX2, and SPX3 may include a first sub-pixel SPX1, a second sub-pixel SPX2, and a third sub-pixel SPX3. The first sub-pixel SPX1 and the second sub-pixel SPX2 may have the same size in the plan view (e.g., planar size or planar area), and the third sub-pixel SPX3 may have a smaller size than the sizes of the first sub-pixel SPX1 and the second sub-pixel SPX2. In an embodiment, for example, the first sub-pixel SPX1 may be a red pixel, the second sub-pixel SPX2 may be a blue pixel, and the third sub-pixel SPX3 may be a green pixel, but the disclosure is not limited thereto.

Various wires (e.g., signal lines) for supplying a driving voltage, a data signal, a scan signal, or the like to the pixel PX may be formed on each bridge pattern BR. In an embodiment, for example, a scan line and a data line may be formed on each bridge pattern BR.

When the display panel DP is folded and the substrate SUB is folded or stretched at the folding area FA, the distance between the island-like patterns IS adjacent to each other may be changed relative to an original distance in the substrate SUB which is unfolded or unstretched. In an embodiment, for example, when the display panel DP is folded around (or about) a first rotation axis FX1 and a second rotation axis FX2 which each extends in the first direction X, so that the substrate SUB is stretched to one side and the other side of the second direction Y, each island-like pattern IS may rotate by about 45° to increase a distance between the island-like patterns IS disposed adjacent to each other in the first direction X and the second direction Y. In this case, the shape of each island-like pattern IS may not be deformed. That is, the width and height of the island-like pattern IS in the plan view may not increase or decrease. Accordingly, the structure of the pixel PX disposed on the island-like pattern IS may not also be deformed.

However, when the display panel DP is folded and the substrate SUB is folded or stretched, the plurality of bridge patterns BR connecting the island-like patterns IS to each other may be deformed. In an embodiment, for example, when the display panel DP is folded around a first rotation axis FX1 and a second rotation axis FX2 each extending in the first direction X, so that the substrate SUB is stretched to one side and the other side in the second direction Y, the bridge pattern BR extending in the second direction Y (e.g., having a major dimension in the second direction Y) may be partially stretched along the second direction Y, and the bridge pattern BR extending in the first direction X (e.g., having a major dimension in the first direction X) may be bent such as about an axis extending in the first direction X. That is, the shape of each island-like pattern IS may not be deformed owing to deformation (e.g., stretching) of the bridge pattern BR extending in the second direction Y and deformation of the bridge pattern BR extending in the first direction X (e.g., bending).

When the display panel DP is folded together with the substrate SUB including the plurality of island-like patterns IS and the plurality of bridge patterns BR at the folding area FA, stress applied to the thin film transistor and the light emitting element disposed on the island-like pattern IS (e.g., at the pixel PX) may be reduced.

The structure of the display panel DP shown in FIG. 7 may be equally applied to the sliding area SA of the display panel DP. During the sliding operation of the display device DD, at least a part of the sliding area SA of the display panel DP may be stretched.

The display device DD which is unfolded may define a first state of the display device DD, the display device DD which is folded may define a second state of the display device DD, and the display device DD which is unfolded and includes a portion which is slid may define a third state of the display device DD. The display device DD may be configured to be freely switchable to any one and among the states among of the first state, the second state, and the third state.

The first state may be a state including the first non-folding area NFA1 and the second non-folding area NFA2 disposed side by side along one plane (e.g., coplanar). The second state may be a state including the first non-folding area NFA1 and the second non-folding area NFA2 disposed parallel to each other and overlapping each other in the thickness direction. The third state may be a state including the first non-folding area NFA1 and the second non-folding area NFA2 disposed side by side on one plane, but the size of the sliding area SA exposed to outside the display device DD is increased compared to the first state.

In the first state, the first non-folding area NFA1, the second non-folding area NFA2, and the folding area FA may be completely exposed to outside the display device DD (e.g., facing outside of the display device DD), while the sliding area SA may be minimally exposed to the outside at the front of the display device DD. In the second state, portions of the display area DA may face each other along the thickness direction so as to not be exposed to the outside. In the third state, the first non-folding area NFA1, the second non-folding area NFA2, and the folding area FA may be completely exposed to the outside, and the sliding area SA may be maximally exposed to the outside at the front of the display device DD.

In the display device DD which is unfolded, the first housing HS1 may be substantially disposed over (e.g., corresponding to) the first non-folding area NFA1 and the sliding area SA. The first housing HS1 may be disposed to surround the sliding area SA at an end portion of the display device DD. The first housing HS1 may be disposed to partially surround the first non-folding area NFA1. In the display device DD which is unfolded, the first housing HS1 may partially overlap the second housing HS2 to define an overlapping area. The sliding operation of the display device DD which is unfolded may be performed by sliding the first housing HS1 in the second direction Y. The size of an overlapping area between the first housing HS1 and the second housing HS2 may change according to the sliding operation of the display device DD. In an embodiment, for example, when the display device DD slidingly extends to increase the exposed area of the sliding area SA of the display panel DP at the front of the display device DD, the size of the overlapping area between the first housing HS1 and the second housing HS2 may decrease, and when the display device DD does not slidingly extend to decrease the exposed area of the sliding area SA of the display panel DP at the front of the display device DD (e.g., is contracted or retracted), the size of the overlapping area between the first housing HS1 and the second housing HS2 may increase.

In addition, a ratio of the size of the sliding area SA of the display panel DP which is surrounded by the first housing HS1 to the size of the first non-folding area NFA1 may change according to the sliding operation of the display device DD. In an embodiment, for example, when the display device DD slidingly extends, a proportion of the size of the sliding area SA of the display panel DP which is surrounded by the first housing HS1 may increase, and a proportion of the size of the first non-folding area NFA1 surrounded by the first housing HS1 may decrease. When the display device DD does not slidingly extend, a proportion of the size of the sliding area SA of the display panel DP which is surrounded by the first housing HS1 may decrease, and a proportion of the size of the first non-folding area NFA1 surrounded by the first housing HS1 may increase.

Figure 12:
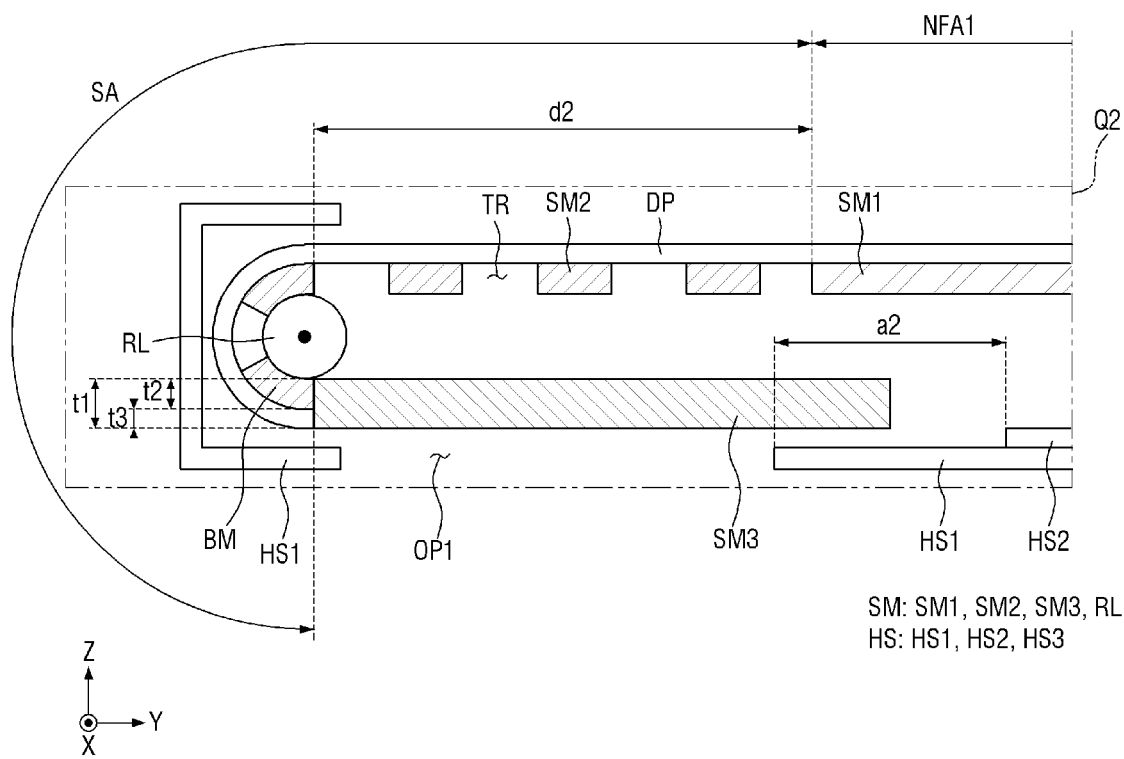
FIG. 12 is an enlarged view of area Q2 of FIG. 11.

When the display device DD slidingly extends by the sliding operation, the second housing HS2 may move away from the first opening OP1 (e.g., a distance between the second housing HS2 and the first opening OP1 may increase). Conversely, when the display device DD does not slidingly extend by the sliding operation, the second housing HS2 may approach the first opening OP1 (e.g., a distance between the second housing HS2 and the first opening OP1 may decrease or be minimum). In an embodiment, for example, a distance a1 between the first opening OP1 and the second housing HS2 in the slidingly non-extended state of the display device DD (FIG. 5) may be smaller than a distance a2 between the first opening OP1 and the second housing HS2 in the slidingly extended state of the display device DD (FIG. 12). The distances a1 and a2 between the first opening OP1 and the second housing HS2 may be defined as a minimum distance between the edge of the first housing HS1 defining the first opening OP1 and being closest to the second housing HS2, and the edge of the second housing HS2 which is closest to the first opening OP1.

In the display device DD, the structure in which the first housing HS1 is disposed to cover the second housing HS2 and be further outside the second housing HS2 is exemplified, but the disclosure is not limited thereto, and the second housing HS2 may be disposed to cover the first housing HS1 (e.g., further away from the display panel DP).

The first housing HS1 may include the first opening OP1 exposing a part of the display panel DP on the rear surface of the display device DD to outside the housing HS. The first opening OP1 may have a rectangular shape as shown in FIG. 3, but is not limited thereto, and may also have a circular, oval, or another polygonal planar shape. In the slidingly non-extended state of the display device DD (FIG. 5), the first opening OP1 may expose a part of the sliding area SA of the display panel DP to outside the housing HS. In the slidingly extended state of the display device DD (FIG. 12), the first opening OP1 may expose a part of the third support member SM3 which extends from a distal end of the display panel DP to be described later. That is, in the slidingly extended state of the display device DD, an area exposed by the first opening OP1 may include the third support member SM3 which is inside the housing HS.

The first housing HS1 may be coupled to the roller member RL. When the first housing HS1 slides relative to the second housing HS2, by the sliding operation of the display device DD, the roller member RL may also move together with the first housing HS1.

The second housing HS2 may be substantially disposed in the first non-folding area NFA1. The second housing HS2 may be disposed on the other side of the hinge member HG in the second direction Y. The second housing HS2 may be rotatably disposed (e.g., rotatable) about the hinge member HG. One side of the second housing HS2 in the second direction Y may be connected to the other side of the hinge member HG in the second direction Y. The second housing HS2 may be disposed between the first housing HS1 and the hinge member HG.

The third housing HS3 may be substantially disposed in the second non-folding area NFA2. The third housing HS3 may be disposed on one side of the hinge member HG in the second direction Y. The third housing HS3 may be rotatably disposed about the hinge member HG. The other side of the third housing HS3 in the second direction Y may be connected to one side of the hinge member HG in the second direction Y. In a plan view, the third housing HS3 may have a size larger than those of the first housing HS1 and the second housing HS2.

As shown in FIG. 2, the display device DD which is folded may include the distal edge of the first housing HS1 which is furthest from the hinge member HG aligned with the distal edge of the third housing HS3 which is furthest from the hinge member HG, forming an edge or an outer end of the display device DD which is furthest from the hinge member HG.

The hinge member HG may be substantially disposed in the folding area FA. The hinge member HG may be disposed between the second housing HS2 and the third housing HS3. The hinge member HG may have a shape having a major dimension extending in the first direction X. The hinge member HG may include at least one rotation shaft. In an embodiment, for example, the hinge member HG may include a first rotation axis FX1 and a second rotation axis FX2, which extend in the first direction X. The first rotation axis FX1 and the second rotation axis FX2 may be arranged adjacent to each other in the second direction Y. The second housing HS2 may rotate about the first rotation axis FX1 of the hinge member HG, and the third housing HS3 may rotate about the second rotation axis FX2 of the hinge member HG. The hinge member HG may include a mechanical hinge and/or an elastic hinge. In an embodiment, for example, the hinge member HG may include at least one member, such as a hinge, a shaft, a rotor, or a cam, for folding the display device DD.

The folding member FM may be disposed on the rear surface of the folding area FA of the display panel DP. When the hinge member HG is folded, the folding member FM may be folded together with the hinge member HG. The other side of the folding member FM in the second direction Y may be coupled to the first support member SM1.

The first support member SM1 may be disposed on the rear surface of the display panel DP that is opposite to the display surface at the first non-folding area NFA1. The first support member SM1 may substantially cover the entire first non-folding area NFA1, but is not limited thereto, and the first support member SM1 may cover a part of the first non-folding area NFA1. One side of the first support member SM1 in the second direction Y may be coupled to the folding member FM.

The second support member SM2 may be disposed on the rear surface of the display panel DP that is opposite to the display surface at the sliding area SA. A plurality of second support members SM2 may be provided. Each of the second support members SM2 may have a bar shape having a major dimension extending in the first direction X. At least some of the plurality of second support members SM2 may be disposed along a rotation direction of the roller member RL (e.g., second direction Y) to surround the roller member RL. At least some of the plurality of second support members SM2 disposed to surround the roller member RL may be in contact with the roller member RL. The plurality of second support members SM2 each having a bar shape may serve to reduce stress occurring in the support member SM during the sliding operation of the display device DD. The second support members SM2 may be disposed to be spaced apart from each other in the second direction Y. A trench TR exposing the rear surface of the display panel DP that is opposite to the display surface at the sliding area SA may be disposed between the second support members SM2.

Among the plurality of second support members SM2, the second support member SM2 disposed closest to the first support member SM1 may be coupled to the first support member SM1. Among the plurality of second support members SM2, the second support member SM2 disposed closest to the third support member SM3 may be coupled to the third support member SM3.

A distance between the second support member SM2 in contact with the roller member RL among the plurality of second support members SM2 and the first support member SM1 may increase in the slidingly extended state of the display device DD, and may decrease in the slidingly non-extended state of the display device DD. In an embodiment, for example, in the slidingly non-extended state of the display device DD, the distance between the second support member SM2 in contact with the roller member RL among the plurality of second support members SM2 and the first support member SM1 may be a first distance d1. In addition, in the slidingly extended state of the display device DD, the distance between the second support member SM2 in contact with the roller member RL among the plurality of second support members SM2 and the first support member SM1 may be a second distance d2 greater than the first distance d1.

The third support member SM3 may be coupled to the distal end of the display panel DP defined by a distal end of the sliding area SA of the display panel DP. The third support member SM3 may be disposed between the second support member SM2 and the hinge member HG, and may be movable along the second direction Y by the sliding operation of the display device DD. In the slidingly non-extended state of the display device DD (FIG. 5), the third support member SM3 may not be exposed through the first opening OP1 of the first housing HS1.

A first thickness t1 of the third support member SM3 may be greater than a third thickness t3 of the display panel DP at the sliding area SA and greater than a second thickness t2 of the second support member SM2. The first thickness t1 of the third support member SM3 may be equal to the sum of the third thickness t3 of the display panel DP at the sliding area SA and the second thickness t2 of the second support member SM2. However, the disclosure is not limited thereto, and the first thickness t1 of the third support member SM3 may be less than or greater than the sum of the third thickness t3 of the display panel DP at the sliding area SA and the second thickness t2 of the second support member SM2.

The first to third support members SM1, SM2, and SM3 may be made of the same material. However, the disclosure is not limited thereto, and the first to third support members SM1, SM2, and SM3 may be made of different materials, or only at least some of them may be made of the same material. The first to third support members SM1, SM2, and SM3, together with the folding member FM and/or the roller member RL, may form a support member SM.

Hereinafter, an embodiment of a folding operation of the display device DD will be described in detail.

The display panel DP may be stretchable and foldable at the folding area FA. The display device DD may be in-folded as shown in FIG. 2. The in-folding may refer to the display device DD being folded such that at least a part of the display area DA of the display panel DP is not exposed to the outside. In an embodiment, for example, the display device DD may be folded such that a part of the display area DA faces the other part of the display area DA, and the display area DA may not be exposed to the outside by being surrounded by at least one other housing constituting the exterior of the display device DD. In an embodiment, for example, the display device DD may be folded such that the display surface at the second non-folding area NFA2 faces the display surface at the first non-folding area NFA1 and the display surface at the sliding area SA.

However, the disclosure is not limited thereto, and although not shown, the display device DD may be out-folded such that the display area DA is exposed to the outside. In detail, the display device DD may be folded such that a part of the display area DA does not face the other part of the display area DA, and the display area DA may be exposed to the outside to constitute at least a part of the exterior of the display device DD. The display device DD may be a bidirectional foldable device capable of both in-folding and out-folding.

Figure 9:
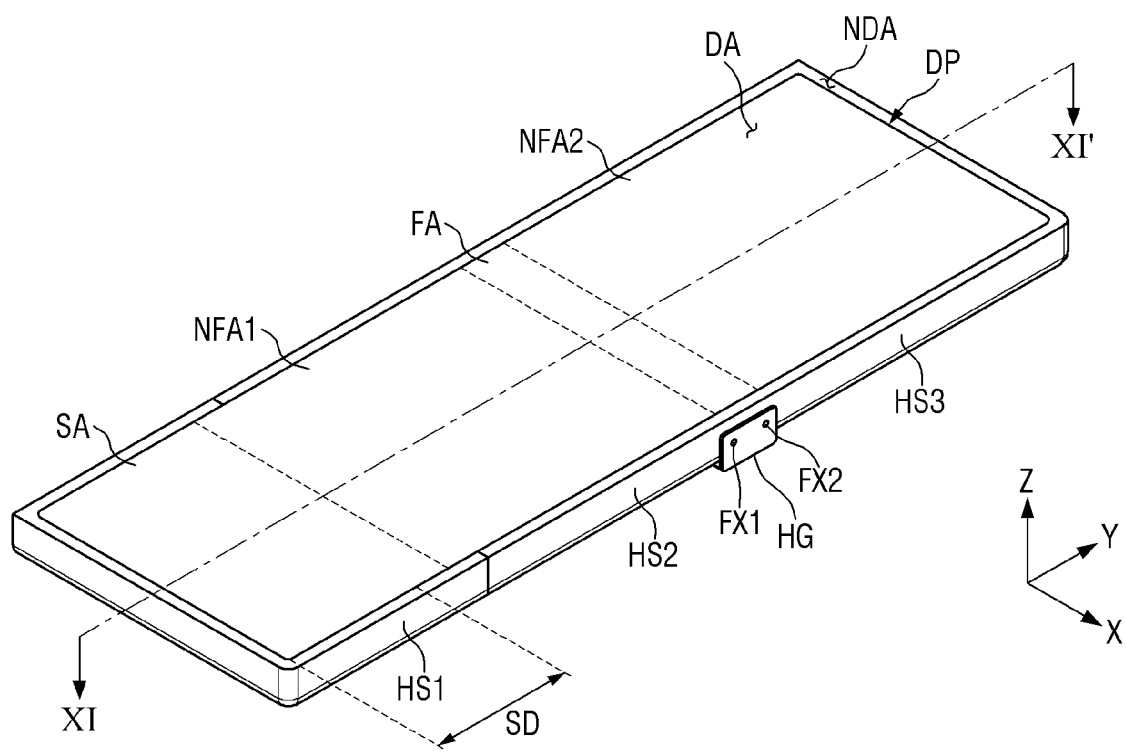
FIG. 9 is a perspective view of an embodiment of the display device which is unfolded and slidingly extended.
Figure 10:
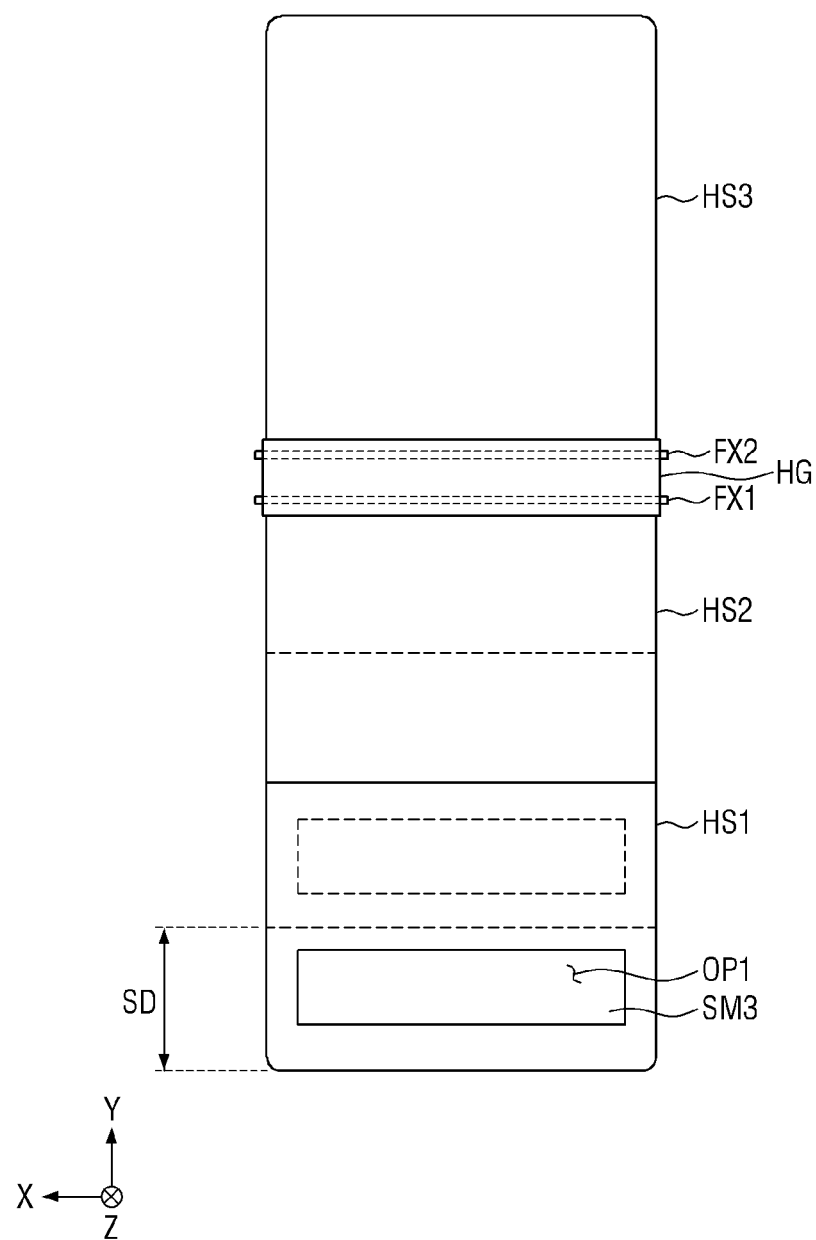
FIG. 10 is a rear plan view of an embodiment of the display device which is unfolded and slidingly extended.
Figure 11:
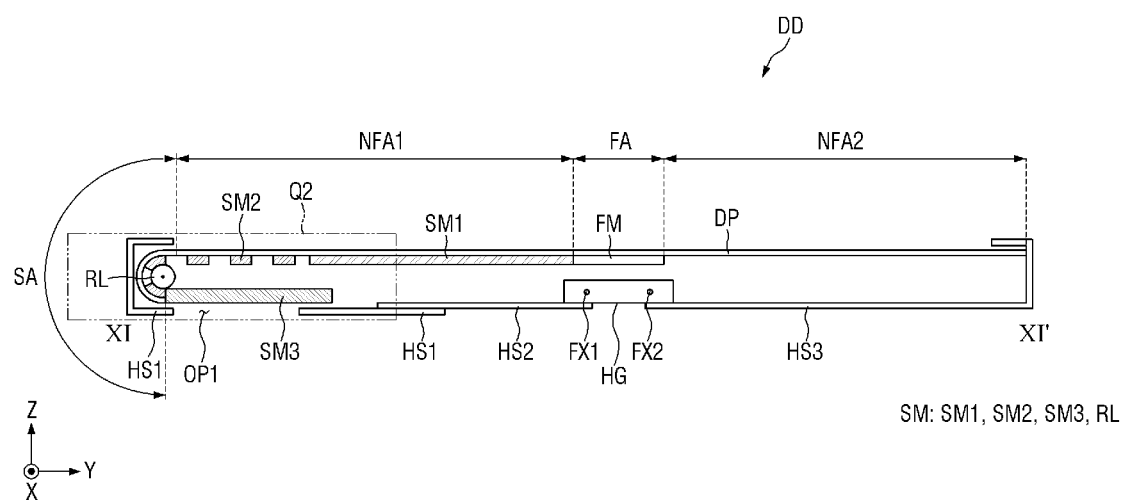
FIG. 11 is a cross-sectional view taken along line XI-XI' of FIG. 9.

FIG. 9 is a perspective view of an embodiment of the display device DD which is unfolded and slidingly extended. FIG. 10 is a rear plan view of the display device DD which is unfolded and slidingly extended. FIG. 11 is a cross-sectional view taken along line XI-XI' of FIG. 9. FIG. 12 is an enlarged view of area Q2 of FIG. 11.

Referring to FIGS. 9 to 12, the display device DD may perform a sliding operation by which the size of the display area DA changes. Specifically, the size of the sliding area SA exposed to the outside of the display device DD may change through the sliding operation of the display device DD, especially at the front of the display device DD. The display device DD may be stretched through the sliding operation such that a length in the first direction X of the sliding area SA exposed to the outside is maintained while changing a length in the second direction Y thereof. The display device DD shown in FIG. 9 is in the slidingly extended state, and may have a structure in which the length in the second direction Y of the sliding area SA exposed to the outside has increased to a maximum length SD. The sliding area SA includes an exposed area of the display surface which is closest to the non-folding area (e.g., first non-folding area NFA1) and exposed to outside the display device DD, the exposed area having a length along the direction (e.g., the second direction Y) which is variable. In an embodiment, the housing HS which is slidably contracted defines a first length of the exposed area of the display surface and further exposes the display surface in the sliding area SA to outside the housing HS, at the first opening OP1, and the housing HS which is slidably extended defines a second length of the exposed area of the display surface which is larger than the first length, and further exposes the support member SM to outside the housing, at the first opening OP1. The sliding operation of the display device DD may include both an operation of the display device DD changing from the slidingly non-extended state to the slidingly extended state and an operation of returning from the slidingly extended state to the slidingly non-extended state (e.g., slidingly contracted).

Although the sliding operation of the display device DD is performed, the sizes of the first non-folding area NFA1, the second non-folding area NFA2, and the folding area FA exposed to the outside may be maintained. In the slidingly extended state of the display device DD, the sum of the size of the first non-folding area NFA1 and the size of the sliding area SA may be greater than the size of the second non-folding area NFA2.

The sliding operation of the display device DD may be performed while the display device DD is completely unfolded. However, the disclosure is not limited thereto, and the sliding operation of the display device DD may be performed in a partially or fully folded state of the display device DD.

The sliding operation of the display device DD may be implemented by sliding movement of the sliding area SA of the display panel DP in a direction away from the second non-folding area NFA2 and sliding movement of the first housing HS1 supporting the sliding area SA in a direction away from the second housing HS2.

The operation of the display device DD from the slidingly non-extended state to the slidingly extended state may be performed by moving the first housing HS1 to the other side of the second direction Y. When the first housing HS1 moves relative to the second housing HS2 and to the other side of the second direction Y, the roller member RL coupled to the first housing HS1 may rotate to slide the second support member SM2 along the roller member RL. Specifically, the second support member SM2 which is originally in contact with the roller member RL, and the first support member SM1, may move away from each other, and the second support member SM2 which is subsequently in contact with the roller member RL and the third support member SM3 may approach each other. That is, a distance between the second support member SM2 which is in contact with the roller member RL, and the first support member SM1, may increase (e.g., first distance d1 to second distance d2), while a distance between the second support member SM2 which is in contact with the roller member RL and the third support member SM3, may decrease. Accordingly, in the display panel DP supported by the second support member SM2, the size of the sliding area SA taken in the second direction Y from an end of the first non-folding area NFA1 and exposed to the outside may increase.

The operation of the display device DD from the slidingly extended state to the slidingly non-extended state may be performed by moving the first housing HS1 to one side of the second direction Y (e.g., in a direction toward the first non-folding area NFA1). When the first housing HS1 moves to one side of the second direction Y, the roller member RL coupled to the first housing HS1 may rotate to slide the second support member SM2 along the roller member RL. Specifically, the second support member SM2 in contact with the roller member RL, and the first support member SM1, may approach each other, and the second support member SM2 in contact with the roller member RL, and the third support member SM3, may move away from each other. That is, a distance between the second support member SM2 which is in contact with the roller member RL, and the first support member SM1, may decrease (e.g., second distance d2 to first distance d1), while a distance between the second support member SM2 which is in contact with the roller member RL and the third support member SM3, may increase. Accordingly, in the display panel DP supported by the second support member SM2, the size of the sliding area SA exposed to the outside may decrease.

In the display device DD, the size of the display area DA in which an image is displayed may be maximized in the unfolded state by increase of a size of the sliding area SA of the display panel DP, while minimizing an overall volume of the display device DD in the folded state. In addition, in display device DD which is slidably extendable along a plane of the display surface to increase the size of the display surface at the sliding area SA of the display device DD, a rear of the display panel DP may be protected by exposing the third support member SM3 through the first opening OP1 of the first housing HS1. A position of the first opening OP1 is movable along the support member SM to be adjacent to the sliding area SA of the display panel DP (FIG. 12) instead of overlapping the sliding area SA (FIG. 5).

Hereinafter, an embodiment of the display device DD will be described. In the following description of the display device DD, redundant parts of the description of the display device DD will be omitted, and differences will be mainly described.

Figure 13:
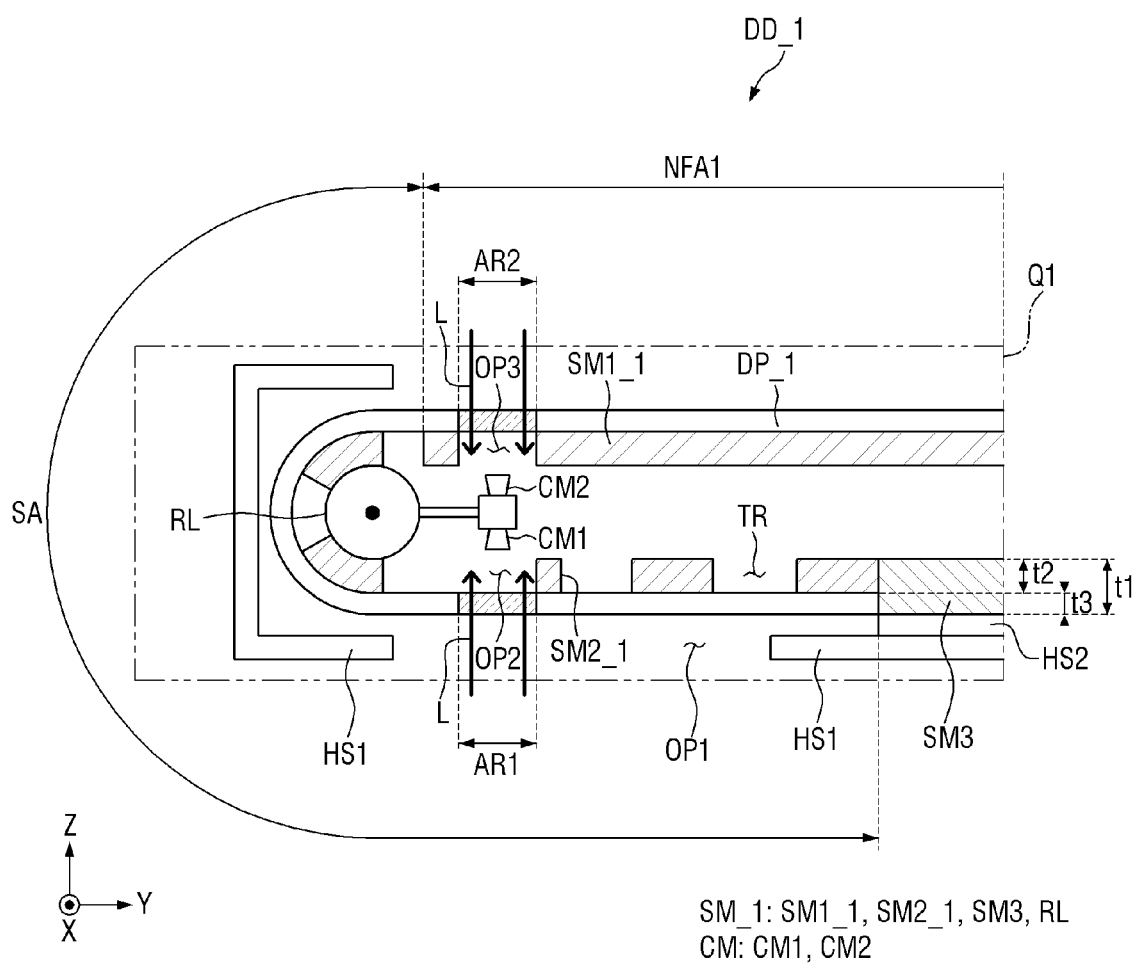
FIG. 13 is a partial cross-sectional view of an embodiment of a display device which is slidingly non-extended.
Figure 14:
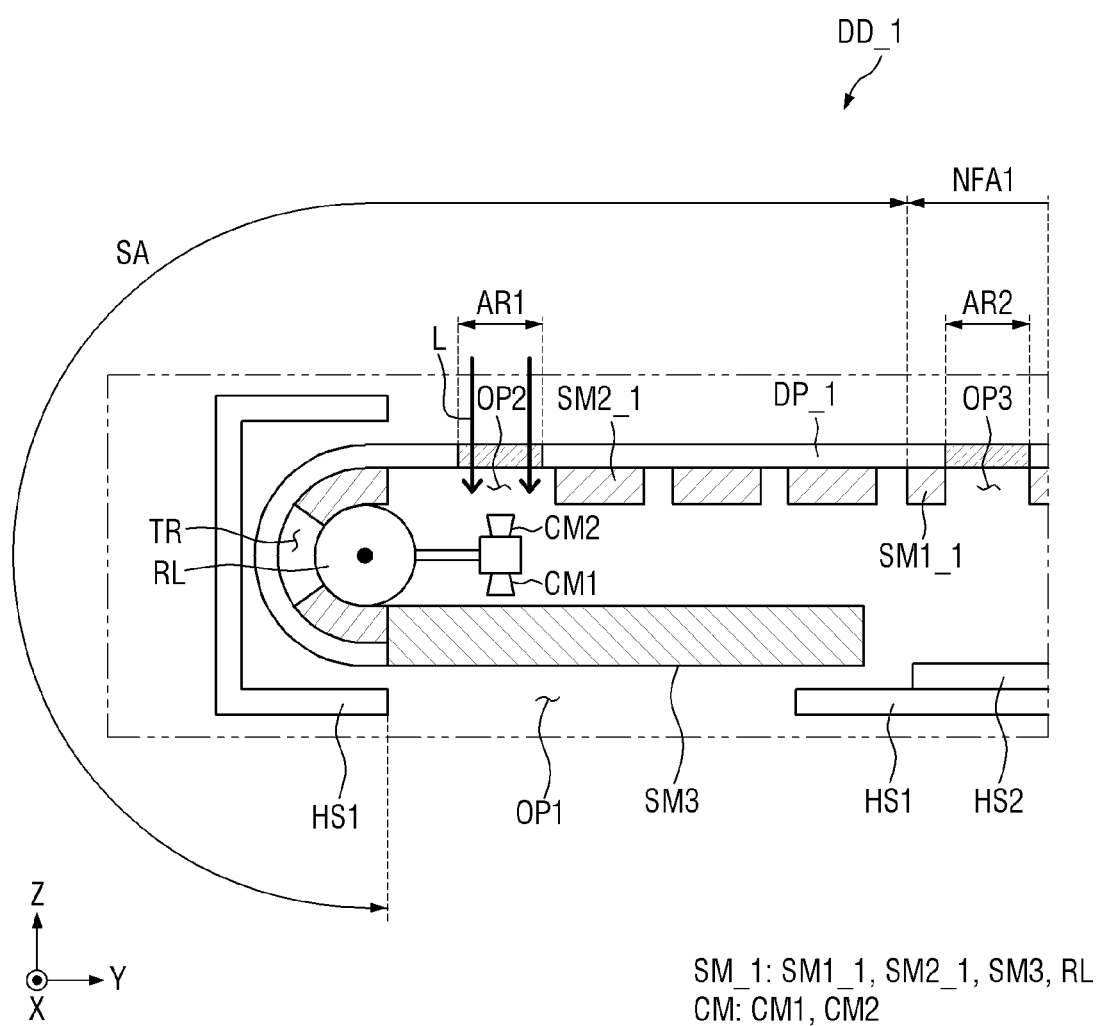
FIG. 14 is a partial cross-sectional view of an embodiment of a display device which is slidingly extended.
Figure 15:
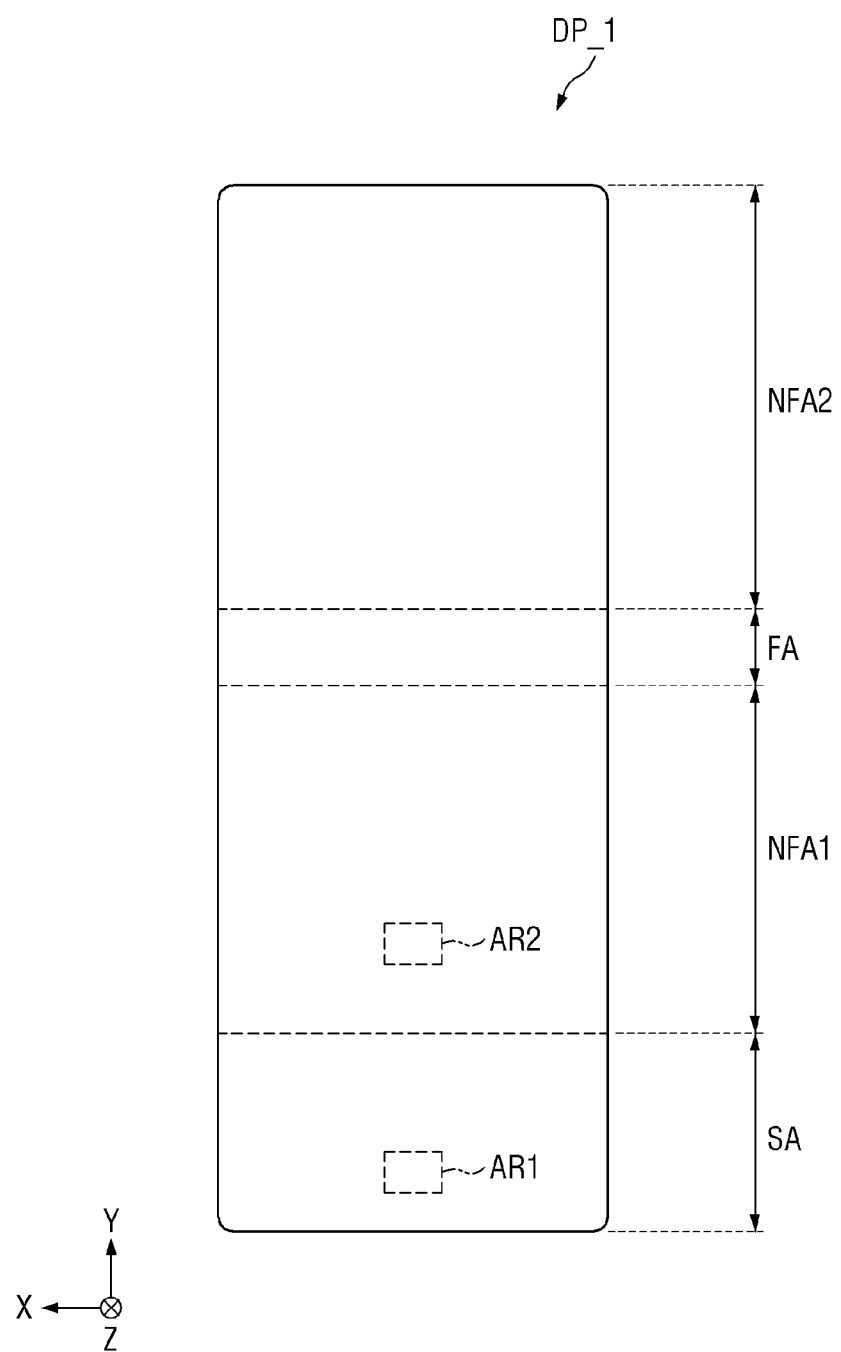
FIG. 15 is a plan view of an embodiment of a display panel of a display device.
Figure 16:
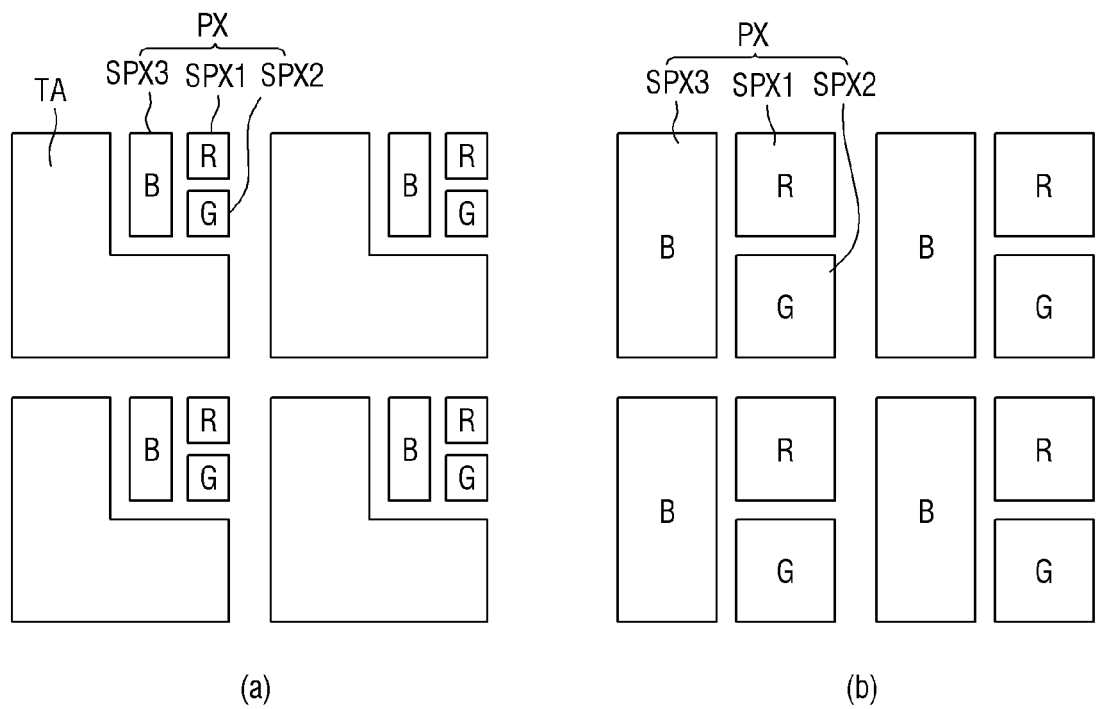
FIG. 16 is a schematic diagram illustrating an embodiment of an arrangement of pixels of a display device.
Figure 17:
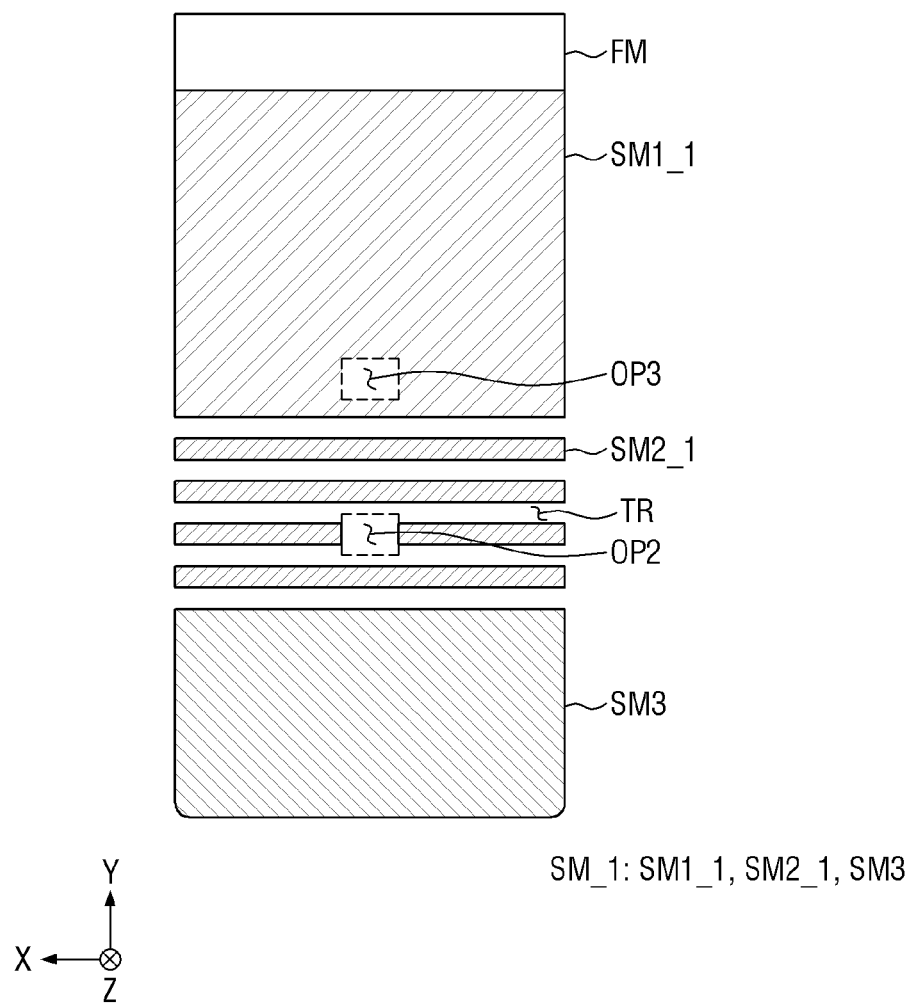
FIG. 17 is a plan view of an embodiment of a support member of a display device.

FIG. 13 is a partial cross-sectional view of an embodiment of a display device DD_1 which is slidingly non-extended (e.g., slidingly contracted). FIG. 14 is a partial cross-sectional view of an embodiment of a display device DD_1 which is slidingly extended. FIG. 15 is a plan view of a display panel DP_1 of a display device DD_1. FIG. 16 is a schematic diagram illustrating an arrangement of pixels PX of a display device DD_1. FIG. 17 is a plan view of a sliding member SM_1 of a display device DD_1.

Referring to FIGS. 13 to 17, a display device DD_1 may include an optical sensor module CM (e.g., optical sensor). In the embodiment, the optical sensor module CM may provide a function to the display device DD_1 and include at least any one of a camera module, a fingerprint recognition sensor, or a face recognition sensor. The optical sensor module CM may be coupled to any one of the roller member RL and the first housing HS1. Accordingly, the optical sensor module CM may move together with the first housing HS1 in a slidingly extended or non-extended state of the display device DD_1.

The optical sensor module CM may include a first module CM1 disposed toward the other side of the third direction Z and a second module CM2 disposed toward one side of the third direction Z.

The sliding area SA of a display panel DP_1 may include a first sensing area AR1 having a light transmittance lower than that of an area adjacent thereto, and the first non-folding area NFA1 may include a second sensing area AR2 having a light transmittance lower than that of an area adjacent thereto. The first sensing area AR1 and the second sensing area AR2 may include a light transmitting area at which an image is displayable and light L provided from the outside (e.g., external light) is transmittable. The optical sensor module CM may be disposed to overlap the first sensing area AR1 and the second sensing area AR2. That is, the first sensing area AR1 and the second sensing area AR2 may be arranged along the display panel DP_1 to respectively correspond to the first module CM1 and the second module CM2. In an embodiment, for example, the housing HS which is slidably contracted (FIG. 13) disposes the first module CM1 of the optical sensor overlapping the first sensing area AR1, and the second module CM2 of the optical sensor overlapping the second sensing area AR2.

In FIG. 16, (a) is a diagram illustrating the arrangement of pixels PX in the first sensing area AR1 and the second sensing area AR2. In FIG. 16, (b) is a diagram illustrating the arrangement of pixels PX in the display area DA except for the first sensing area AR1 and the second sensing area AR2.

Referring to (a) and (b) of FIG. 16, the first sensing area AR1 and the second sensing area AR2 may include a plurality of pixels PX.

Each of the plurality of pixels PX may include a first sub-pixel SPX1, a second sub-pixel SPX2, and a third sub-pixel SPX3, which emit internal light from the inside of different colors. The sub-pixels SPX1, SPX2, and SPX3 may be formed in a rectangular shape, but the shape and arrangement of the sub-pixels SPX1, SPX2, and SPX3 are not limited thereto.

Referring to (a) of FIG. 16, the first sensing area AR1 and the second sensing area AR2 may further include a light transmitting portion TA disposed between the plurality of pixels PX.

The light transmitting portion TA (light transmitting area) is an area through which incident light passes. That is, an object or a background disposed on the rear surface of the display panel DP_1 may be viewable through the light transmitting portion TA.

In embodiments, the display panel DP_1 is an organic light emitting diode display panel DP_1, and the light transmitting portion TA may be a region in which a light transmitting layer such as a buffer layer, an insulating layer, a passivation layer, a planarization layer, an encapsulation layer, or an electrode layer constituting the organic light emitting diode display panel DP_1 is stacked. Alternatively, the light transmitting portion TA may be a region in which all or a part of a buffer layer, an insulating layer, a passivation layer, a planarization layer, an encapsulation layer, or an electrode layer constituting the organic light emitting diode display panel DP_1 is removed to increase light transmittance.

Referring to (a) of FIG. 16, an area where the light transmitting portion TA is disposed may be larger than an area where the plurality of pixels PX are disposed. The light transmitting portion TA may be arranged to surround a corner portion of a region of each of the plurality of pixels PX. However, the shape, size, and arrangement of the light transmitting portion TA are not limited thereto.

Referring to (b) of FIG. 16, since the display area DA except for the first sensing area AR1 and the second sensing area AR2 (e.g., remaining display area) does not include the light transmitting portion TA, the remaining display area has a light transmittance lower than that of the first sensing area AR1 and the second sensing area AR2.

Referring to (a) and (b) of FIG. 16, the size of the plurality of pixels PX disposed in the first sensing area AR1 and the second sensing area AR2 may be smaller than the size of the plurality of pixels PX disposed in a remainder of the display area DA except for the first sensing area AR1 and the second sensing area AR2. The number of the plurality of pixels PX disposed in the first sensing area AR1 and the second sensing area AR2 may be substantially the same as the number of the plurality of pixels PX disposed in the remainder of the display area DA except for the first sensing area AR1 and the second sensing area AR2.

In the slidingly non-extended state of the display device DD_1 (FIG. 13), the first module CM1 may overlap the first sensing area AR1. That is, in the slidingly non-extended state of the display device DD_1, the first module CM1 may receive the light L provided from the outside through the first sensing area AR1. In the slidingly non-extended state of the display device DD_1, the second module CM2 may overlap the second sensing area AR2. That is, in the slidingly non-extended state of the display device DD_1, the second module CM2 may receive the light L provided from the outside through the second sensing area AR2.

In the slidingly extended state of the display device DD_1 (FIG. 14), the second module CM2 may overlap the first sensing area AR1. That is, in the slidingly extended state of the display device DD_1, the second module CM2 may receive the light L provided from the outside through the first sensing area AR1. The first sensing area AR1 may be movable relative to the optical sensor module CM to correspond to the first module CM1 or the second module CM2.

A second support member SM2_1 may include a second opening OP2 disposed in a region overlapping the first module CM1 in the slidingly non-extended state of the display device DD_1. The second opening OP2 may overlap the first sensing area AR1 of the display panel DP_1. In the slidingly non-extended state of the display device DD_1, the second opening OP2 may overlap the first opening OP1. That is, the first module CM1 may receive the light L from a rear side of the display device DD_1 through the first opening OP1, the second opening OP2, and the first sensing area AR1 in the slidingly non-extended state of the display device DD_1. Accordingly, the fingerprint recognition, face recognition, or the like may be performed through the first opening OP1 of the first housing HS1 in both the folded state and the slidingly non-extended state of the display device DD_1. Accordingly, in a case of unlocking of the display device DD_1 or in some other cases, the display device DD_1 may be connected to the hinge member HG to perform an automatic folding/unfolding function.

The second opening OP2 may overlap the second module CM2 in the slidingly extended state of the display device DD_1. That is, the second module CM2 may receive the light L from a front side of the display device DD_1 through the second opening OP2 in the slidingly extended state of the display device DD_1. In an embodiment, the housing HS which is slidably extended (FIG. 14) disposes the second module CM2 of the optical sensor exposed to external light through the first sensing area AR1 of the display panel DP_1 and the second opening OP2 of the support member SM (e.g., second support member SM2_1).

A first support member SM1_1 may include a third opening OP3 disposed in an area overlapping the second module CM2 in the slidingly non-extended state of the display device DD_1. The third opening OP3 may overlap the second sensing area AR2 of the display panel DP_1. That is, the second module CM2 may receive the light L from the front side of the display device DD_1 through the third opening OP3 and the second sensing area AR2 in the slidingly non-extended state of the display device DD_1. In the slidingly extended state of the display device DD_1, the first opening OP1 may overlap the third support member SM3.

A distance between one end of the second opening OP2 and one end of the third opening OP3 may be substantially equal to a maximum slidable distance of the display device DD_1. That is, the distance between one end of the second opening OP2 and one end of the third opening OP3 may be substantially equal to a difference in an overall length in the second direction Y of the display device DD_1 between the slidingly non-extended state and the slidingly extended state.

In the display device DD_1, the size of the display area DA in which an image is displayed may be maximized in the unfolded state while minimizing the volume the display device DD_1 in the folded state. Further, the display panel DP_1 may be protected by exposing the third support member SM3 through the first opening OP1 of the first housing HS1 in the slidingly extended state.

Furthermore, the display device DD_1 may include the optical sensor module CM including the first module CM1 disposed toward the other side of the third direction Z and the second module CM2 disposed toward one side of the third direction Z (e.g., facing in opposite directions). Accordingly, in the unfolded and slidingly non-extended state, the display device DD_1 may receive and sense the light L provided from one side of the third direction Z, and at the same time, may receive and sense the light L provided from the other side of the third direction Z. In addition, the display device DD_1 may receive and sense the light L, provided from one side of the third direction Z, through the second module CM2 in the unfolded and slidingly extended state.

Figure 18:
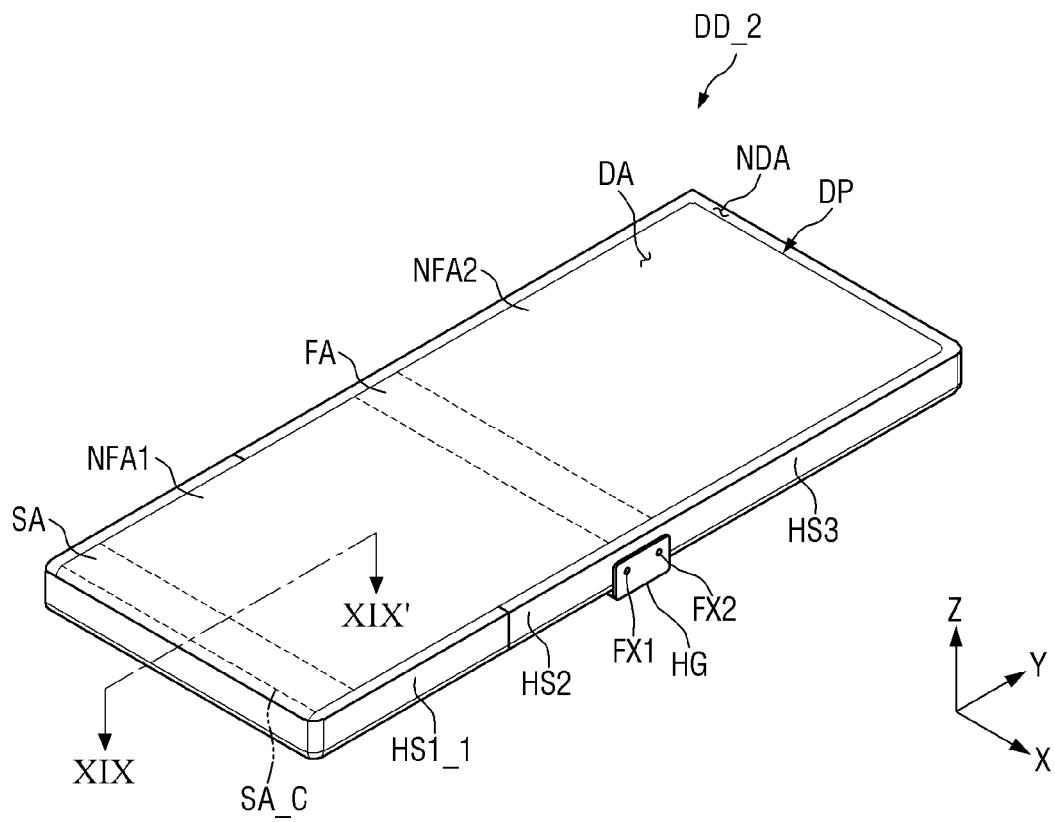
FIG. 18 is a perspective view of an embodiment of a display device which is slidingly non-extended.
Figure 19:
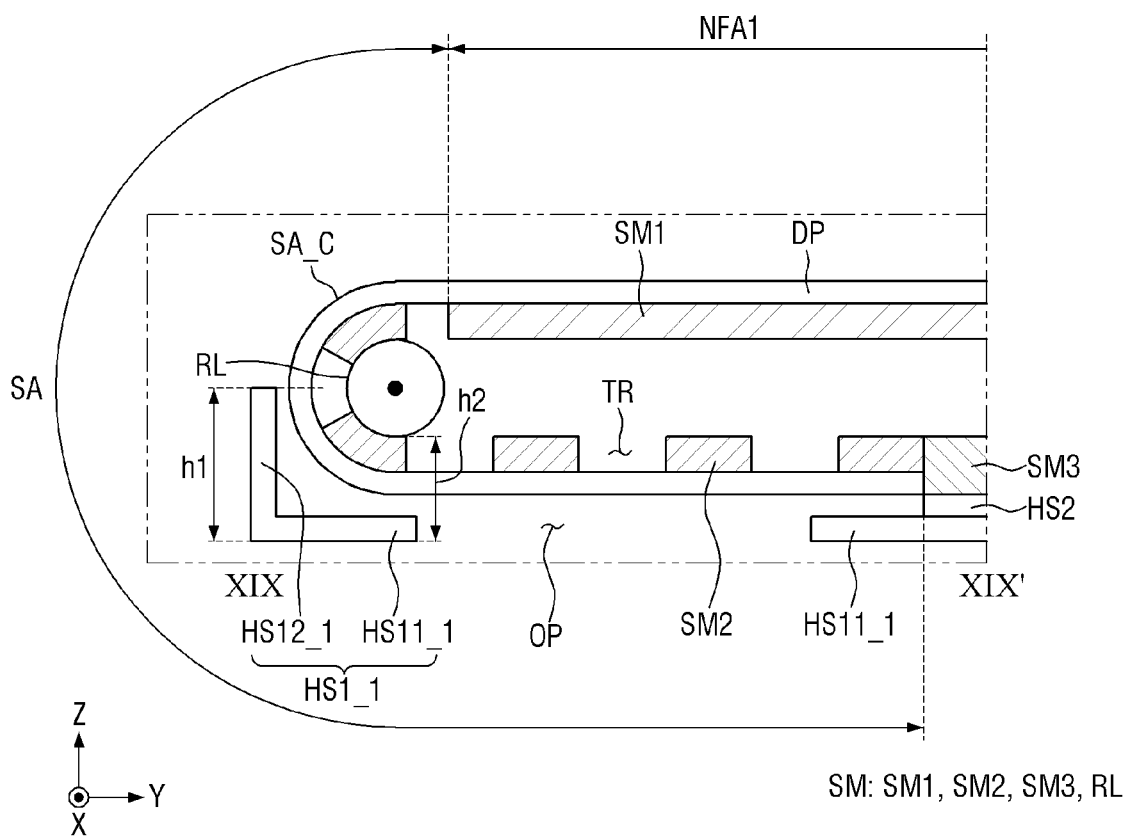
FIG. 19 is a cross-sectional view taken along line XIX-XIX' of FIG. 18.
Figure 20:
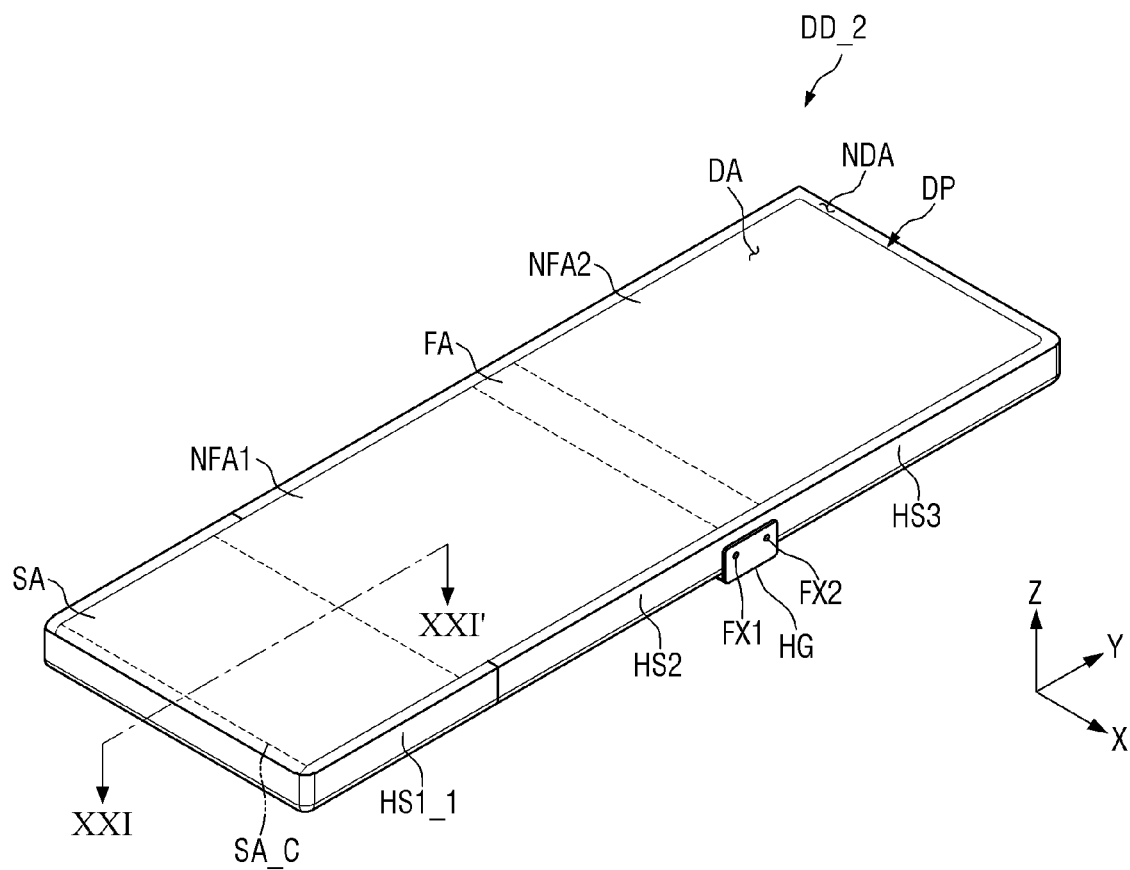
FIG. 20 is a perspective view of an embodiment of a display device which is slidingly extended.
Figure 21:
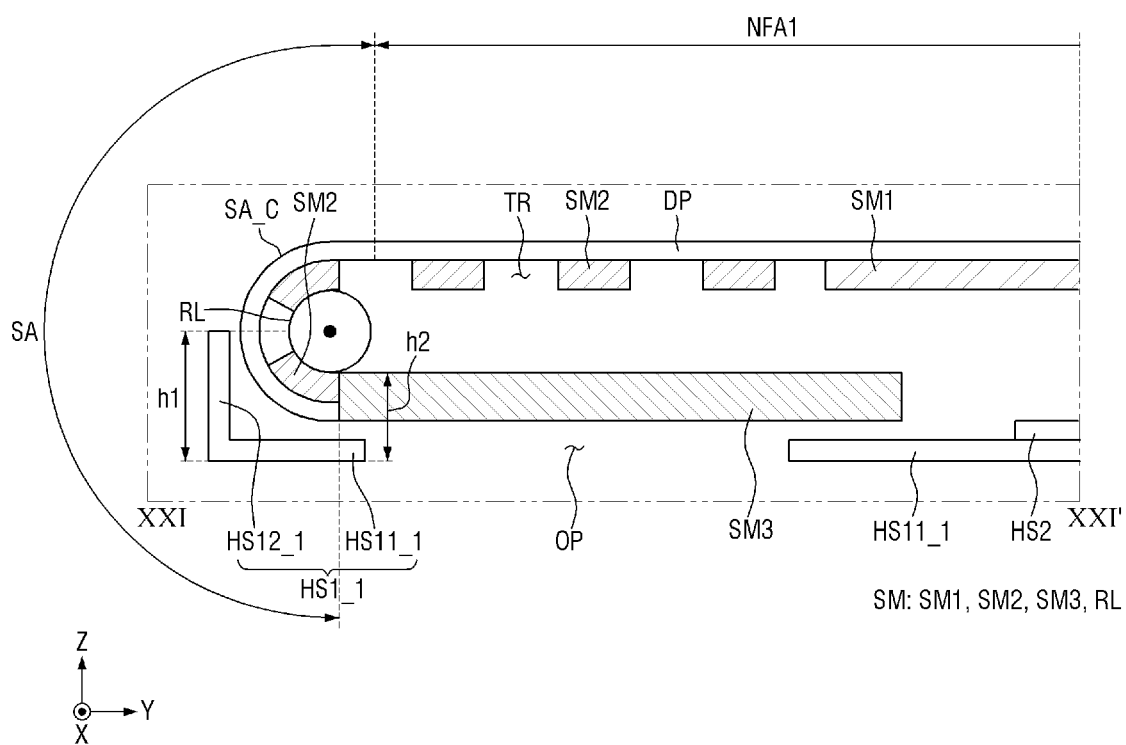
FIG. 21 is a cross-sectional view taken along line XXI-XXI' of FIG. 20.

FIG. 18 is a perspective view of an embodiment of a display device DD_2 which is slidingly non-extended. FIG. 19 is a cross-sectional view taken along line XIX-XIX' of FIG. 18. FIG. 20 is a perspective view of a display device DD_2 which is slidingly extended. FIG. 21 is a cross-sectional view taken along line XXI-XXI' of FIG. 20.

Referring to FIGS. 18 to 21, a display device DD_2 is different from the display device DD in that it may include a first housing HS1_1 having a different shape.

The display device DD_2 may include the first housing HS1_1 exposing not only a front side of the display panel DP but also a part in the other side of the second direction Y of the sliding area SA of the display panel DP (e.g., a curved side of the display panel DP). Accordingly, in the display device DD_2, a curved portion SA_C of the sliding area SA of the display panel DP facing the other side of the second direction Y and one side of the third direction Z may be exposed to the outside the first housing HS1_1.

A central angle of a curved portion SA_C of the sliding area SA that is exposed without being covered by the first housing HS1_1 may be an acute angle. The central angle of the curved portion SA_C of the sliding area SA that is exposed without being covered by the first housing HS1_1 may mean a minimum central angle of the curved portion SA_C that does not overlap the first housing HS1_1 in the sliding area SA.

However, the disclosure is not limited thereto, and the central angle of the curved portion SA_C of the sliding area SA that is exposed without being covered by the first housing HS1_1 may be a right angle or an obtuse angle.

In the embodiment, the first housing HS1_1 may have an 'L' shape instead of a 'U' shape (FIG. 5). Specifically, the first housing HS1_1 may include a bottom surface portion HS11_1 parallel to a plane defined by the first direction X and the second direction Y and including the first opening OP1, and a sidewall portion HS12_1 bent from the other end in the second direction Y of the bottom surface portion HS11_1 toward one side of the third direction Z.

A first height h1 of the sidewall portion HS12_1 may be greater than a second height h2 of the roller member RL. The first height h1 of the sidewall portion HS12_1 may mean a distance from the bottom surface of the bottom surface portion HS11_1 to the top surface of the sidewall portion HS12_1. The second height h2 of the roller member RL may mean a distance from the bottom surface of the bottom surface portion HS11_1 to the roller member RL. However, the disclosure is not limited thereto, and the first height h1 of the sidewall portion HS12_1 may be less than or equal to the second height h2 of the roller member RL.

In the display device DD_2, the size of the display area DA in which an image is displayed may be maximized in the unfolded state while minimizing the volume of the display device DD_2 in the folded state. Further, the display panel DP may be protected by exposing the third support member SM3 through the first opening OP1 of the first housing HS1_1 in the slidingly extended state.

Furthermore, the display device DD_2 may include the first housing HS1_1 exposing the edge portion of the sliding area SA of the display panel DP, thereby displaying an image on a wider area of the display panel DP.

What is claimed is:
1. A display device comprising:
a display panel including:
a folding area, a non-folding area and a sliding area in order along a first direction,
a display surface in each of the non-folding area and the sliding area, and
the sliding area including an exposed area of the display surface which is closest to the non-folding area and exposed to outside the display device, the exposed area having a length along the first direction which is variable;
a support member which is coupled to the display panel and movable together with the display panel; and
a housing which faces the support member with the display panel therebetween and defines a first opening corresponding to the non-folding area of the display panel, wherein
the housing is slidably extendable and slidably contractable along the first direction, at the sliding area of the display panel,
the housing which is slidably contracted defines a first length of the exposed area of the display surface and further exposes the display surface in the sliding area to outside the housing, at the first opening, and
the housing which is slidably extended defines a second length of the exposed area of the display surface which is larger than the first length, and further exposes the support member to outside the housing, at the first opening.

2. The display device of claim 1, wherein the housing includes:
a first housing extended along the sliding area of the display panel and defining the first opening which corresponds to the non-folding area of the display panel; and
a second housing corresponding to the non-folding area, overlapping the first housing and slidable relative to the first housing,
wherein sliding extension of the housing moves the second housing away from the first opening of the first housing, along the first direction, to define the second length of the exposed area of the display surface which is larger than the first length.

3. The display device of claim 2, wherein the support member includes on a rear surface of the display panel which is opposite to the display surface, in order along the first direction:
a first support member corresponding to the non-folding area of the display panel;
a plurality of second support members corresponding to the sliding area of the display panel, the plurality of second support members spaced apart from each other and from the first support member along the first direction; and
a third support member spaced apart from the plurality of second support members.

4. The display device of claim 3, further comprising a roller member coupled to the first housing and rotatable along the first direction,
wherein the plurality of second support members are movable along the roller member together with the display panel.

5. The display device of claim 4, wherein along the first direction:
the housing which is slidably contracted defines a first distance between the first support member and the plurality of second support members arranged along the roller member, and
the housing which is slidably extended defines a second distance between the first support member and the plurality of second support members arranged along the roller member, which is larger than the first distance.

6. The display device of claim 4, further comprising an optical sensor which is coupled to the first housing,
wherein the optical sensor includes:
a first module facing the first opening of the first housing, and
a second module facing in a direction opposite to the first module.

7. The display device of claim 6, wherein
within the display panel:
the sliding area includes a first sensing area having a light transmittance lower than a light transmittance of an area adjacent to the first sensing area, and
the non-folding area includes a second sensing area having a light transmittance lower than a light transmittance of an area adjacent to the second sensing area, and
the housing which is slidably contracted disposes:
the first module of the optical sensor overlapping the first sensing area of the display panel, and
the second module of the optical sensor overlapping the second sensing area of the display panel.

8. The display device of claim 7, wherein
within the support member:
the plurality of second support members defines a second opening which exposes the rear surface of the display panel at the sliding area to outside the support member, and
the first support member defines includes a third opening which exposes the rear surface of the display panel at the non-folding area to outside the support member, and
the housing which is slidably contracted further disposes:
the second opening of the support member overlapping the first sensing area of the display panel, and
the third opening of the support member overlapping the second sensing area of the display panel.

9. The display device of claim 8, wherein
the housing which is slidably contracted further disposes,
the first module exposed to external light through the first opening of the first housing, the first sensing area of the display panel and the second opening of the support member, and
the second module exposed to external light through the second sensing area of the display panel and the third opening of the support member, and
the housing which is slidably extended disposes the second module of the optical sensor exposed to external light through the first sensing area of the display panel and the second opening of the support member.

10. The display device of claim 3, wherein
each of the display panel, the second support member and the third support member has a thickness, and
the thickness of the third support member is greater than the thickness of the second support member or the thickness of the display panel.

11. The display device of claim 2, wherein
the sliding area of the display panel includes a curved portion which is extended from the non-folding area and defines an outer end of the display panel, and
at the outer end of the display panel, the first housing exposes the curved portion of the sliding area to outside the housing.

12. The display device of claim 2, wherein sliding extension of the housing moves the second housing away from the first opening of the first housing, along the first direction.

13. The display device of claim 1, wherein
the display panel is foldable at the folding area and includes a substrate in the folding area and in the sliding area, and
the substrate at the folding area or the sliding area includes a plurality of island patterns spaced apart from each other and a plurality of bridge patterns respectively connecting the plurality of island-like patterns to each other.

14. A display device comprising:
a display panel including:

a folding area, a non-folding area and a sliding area in order along a first direction, and a display surface in each of the non-folding area and the sliding area, and a rear surface which is opposite to the display surface;

a support member on the rear surface of the display panel, the support member including:

a roller member rotatable along the first direction, and a plurality of support members coupled to the display panel and movable together with the display panel around the roller member, the plurality of support members spaced apart from each other along the first direction from the non-folding area to the sliding area of the display panel, and a housing which faces the support member with the display panel therebetween and defines a first opening corresponding to the non-folding area of the display panel, wherein the housing is foldable at the folding area together with the display panel, slidably extendable along the first direction at the sliding area of the display panel, and slidably contractable along the first direction at the sliding area of the display panel, the housing which is folded and slidingly contracted and the housing which is unfolded and slidingly contracted, exposes the display surface at the sliding area of the display panel to outside the housing, at the first opening, and the housing which is unfolded and slidingly extended exposes the support member to outside the housing, at the first opening.

15. The display device of claim 14, wherein the plurality of support members includes a first support member closest the non-folding area and a plurality of second support members which are arranged along the roller member, the housing which is slidably contracted defines a first distance between the first support member and the plurality of second support members which are arranged along the roller member, and the housing which is slidably extended defines a second distance between the first support member and the plurality of second support members which are arranged along the roller member, which is larger than the first distance.

16. The display device of claim 14, further comprising an optical sensor which is coupled to the housing, wherein the optical sensor includes:

a first module facing the first opening of the housing, and a second module facing a direction opposite to the first module, within the display panel:

the sliding area includes a first sensing area having a light transmittance lower than a light transmittance of an area adjacent to the first sensing area, and the non-folding area includes a second sensing area having a light transmittance lower than a light transmittance of an area adjacent to the second sensing area, and both the housing which is folded and slidingly contracted and the housing which is unfolded and slidingly contracted disposes:

the first module of the optical sensor overlapping the first sensing area of the display panel, and the second module of the optical sensor overlapping the second sensing area of the display panel.

17. The display device of claim 16, wherein the plurality of support members defines:

a second opening which exposes the rear surface of the display panel at the sliding area to outside the support member, and a third opening which exposes the rear surface of the display panel at the non-folding area to outside the support member, the second opening of the support member overlaps the first sensing area of the display panel, and the third opening of the support member overlaps the second sensing area of the display panel.

18. The display device of claim 17, wherein the housing which is unfolded and slidingly contracted disposes:

the first module of the optical sensor exposed to external light through the first opening of the housing, the first sensing area of the display panel and the second opening of the support member, and the second module of the optical sensor exposed to external light through the second sensing area of the display panel and the third opening of the support member, and the housing which is unfolded and slidingly extended disposes the second module of the optical sensor exposed to external light through the first sensing area of the display panel and the second opening of the support member.

19. The display device of claim 14, wherein the sliding area of the display panel includes a curved portion which is extended from the non-folding area and defines an outer end of the display panel, and at the outer end of the display panel, the housing exposes the curved portion of the sliding area to outside the housing.

20. The display device of claim 14, wherein the display surface at the sliding area faces in a facing direction, and movement the plurality of support members around the roller member changes the facing direction of the display surface at the sliding area.

* * * * *